US 6,731,778 B1

(12) United States Patent
Oda et al.

(10) Patent No.: US 6,731,778 B1
(45) Date of Patent: May 4, 2004

(54) PHOTOGRAPHING APPARATUS AND MONITORING SYSTEM USING SAME

(75) Inventors: Takahiro Oda, Tokyo (JP); Yuji Ohta, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/536,987

(22) Filed: Mar. 29, 2000

(30) Foreign Application Priority Data

Mar. 31, 1999 (JP) .......................................... 11-090457
Sep. 29, 1999 (JP) .......................................... 11-276208

(51) Int. Cl.$^7$ ................................................ G06K 9/00
(52) U.S. Cl. ...................... 382/118; 382/115; 348/156; 396/326; 705/43; 902/8
(58) Field of Search ......................... 382/103, 115–118, 382/173, 181, 190, 209, 216, 218, 224, 321; 235/379; 340/426.1, 541; 348/150, 156, 161, 149, 159, 218.1; 705/35, 43, 44; 902/4, 8, 25; 396/322, 326, 332

(56) References Cited

U.S. PATENT DOCUMENTS

| | | | | |
|---|---|---|---|---|
| 4,245,902 A | * | 1/1981 | Cataldo et al. | 396/502 |
| 4,821,118 A | * | 4/1989 | Lafreniere | 348/156 |
| 4,991,008 A | * | 2/1991 | Nama | 348/150 |
| 5,765,063 A | * | 6/1998 | Fukuda et al. | 396/332 |
| 5,894,530 A | * | 4/1999 | Wilt | 382/321 |
| 5,975,710 A | * | 11/1999 | Luster | 359/856 |
| 6,026,188 A | * | 2/2000 | Dionysian | 382/216 |
| 6,308,887 B1 | * | 10/2001 | Korman et al. | 235/379 |
| 6,323,761 B1 | * | 11/2001 | Son | 340/426 |

FOREIGN PATENT DOCUMENTS

| | | | | |
|---|---|---|---|---|
| FR | 2576436 A2 | * | 1/1985 | G07F/7/08 |
| JP | 07-049915 | * | 2/1995 | G06F/19/00 |
| JP | 09-147182 | * | 9/1997 | G07D/9/00 |

* cited by examiner

Primary Examiner—Daniel Mariam
(74) Attorney, Agent, or Firm—Rabin & Berdo, P.C.

(57) ABSTRACT

An object of the invention is to provide a photographing apparatus capable of verifying with ease that a transaction processing unit has been wrongfully utilized, and at the same time, reducing an amount of image data for each case of transaction processing while lowering the cost thereof, and a monitoring system using the photographing apparatus. To this end, the photographing apparatus according to the invention includes an image forming element having an image forming face, a photographing field angle dividing arrangement for dividing a photographing field angle into photographing field angles A, B so as to correspond with a plurality of sites to be photographed, and forming an image of the respective sites to be photographed on the image forming element, and an image data generation arrangement for generating image data of the respective sites to be photographed on the basis of output of the image forming element. In this case, since the images of the plurality of the sites to be photographed can be formed on the image forming face of one image forming element, the plurality of the sites to be photographed can be simultaneously photographed with one unit of image pickup camera. It becomes therefore unnecessary to install a plurality of the image pickup camera in order to photograph the respective sites to be photographed.

19 Claims, 24 Drawing Sheets

PHOTOGRAPHING APPARATUS AND MONITORING SYSTEM USING SAME

BACKGROUND OF THE INVENTION

1. Field of the Invention

The present invention relates to a photographing apparatus for monitoring those who commit a wrongful act against transaction processing units such as an automated-teller machine (ATM), unattended transaction terminal, shopping terminal, vending machine, POS terminal (including a cash register), and so forth, and a monitoring system using the same.

2. Description of the Related Art

Crimes such as drawing cash out of another person's account, shopping in the name of another person, and so forth have been committed by use of a stolen cash card or credit card. Financial institutions and distribution organizations have coped with these crimes by mounting a photographing apparatus equipped with a camera inside or in the upper part of transaction processing units, or by attaching the photographing apparatus in the corner of the ceiling of rooms where the transaction processing units are installed so as to be able to photograph the face and body of users of the transaction processing units.

However, with conventional photographing apparatuses, a camera is required for the face of the users, and every part (referred to hereinafter as sites to be photographed) of the body of the users, to be photographed, respectively, thereby resulting in a high cost, and at the same time, an increase in size. Further, as the face and body of the users are captured in respective image frames, an increase in image data to that extent has resulted.

Furthermore, with the conventional photographing apparatuses, for monitoring from a remote location actions of users of a transaction processing unit by photographing the face and body of the users of the transaction processing unit, and displaying images thereof at the remote location, there is the need of installing a monitor for the face to display an image of the face and a monitor for the body to display an image of the body, respectively, or displaying on a single monitor the image of the face, combined with the image of the body. In the case of installing a monitor for the face and a monitor for the body, respectively, two monitors are required, leading to a high cost. Then, in the case of displaying on a single monitor the image of the face, combined into one with the image of the body, a image processing unit is required, whereby a predetermined processing is applied to image data for the face and the body, respectively, again leading to a high cost.

In addition, with the conventional photographing apparatuses, a field of view of the camera thereof is narrow, and consequently, principal parts of the users of the transaction processing unit can at times come into a blind spot. In such a case, even if the transaction processing unit is wrongfully utilized, it becomes impossible to photograph actions of the users in a region within reach of their hands, or actions of the users making access to a transaction slot (card slot, bankbook slot, bank note slot, coin slot, and so forth), and so on, thus rendering it difficult to substantiate that the transaction processing unit has been wrongfully utilized. In particular, there has recently been an increase in such crimes as forging a card rather than stealing a card, drawing cash out of another person's account, shopping in the name of another person, and so forth with the use of the forged card. In this case, since the genuine owner of the card will not notice for some time that a crime has occurred, the crime is often discovered later on. As a result, with the elapse of time after the crime was committed, it becomes difficult at times to verify that the transaction processing unit was wrongfully utilized. Also, there has recently been an increase in such crimes as shopping at a vending machine with the use of forged coins, thereby wrongfully acquiring goods and change. In this case as well, since it is impossible to determine who used the forged coins, it is difficult to verify that the transaction processing unit was wrongfully utilized. Furthermore, there have occurred such crimes as stealing information contained in another person's card by attaching illegal equipment to a POS terminal (including a cash register). In this case as well, since it is impossible to determine who attached the illegal equipment thereto or who operated the transaction processing unit, it is difficult to verify that the transaction processing unit was wrongfully utilized. Thus, the conventional photographing apparatuses have been unable to properly deal with the crimes described above.

SUMMARY OF THE INVENTION

The invention has been developed to solve the problems described above, and an object of the invention is to provide a photographing apparatus capable of verifying with ease that a transaction processing unit has been wrongfully utilized, and at the same time, reducing an amount of image data for each case of transaction processing while lowering the cost thereof, and a monitoring system using the photographing apparatus.

To this end, the photographing apparatus according to the invention comprises an image forming element having an image forming face, photographing field angle dividing means for dividing a photographing field angle so as to correspond with a plurality of sites to be photographed, and forming an image of the respective sites to be photographed on the image forming element, and image data generation means for generating image data of the respective sites to be photographed on the basis of output of the image forming element.

Further, the monitoring system according to the invention comprises a transaction processing unit, and a photographing apparatus for photographing a user of the transaction processing unit, wherein the photographing apparatus records in recording means image data of the user photographed so as to correspond with operation of the transaction processing unit in the course of transaction.

DETAILED DESCRIPTION OF THE PREFERRED EMBODIMENTS

Figure 1:
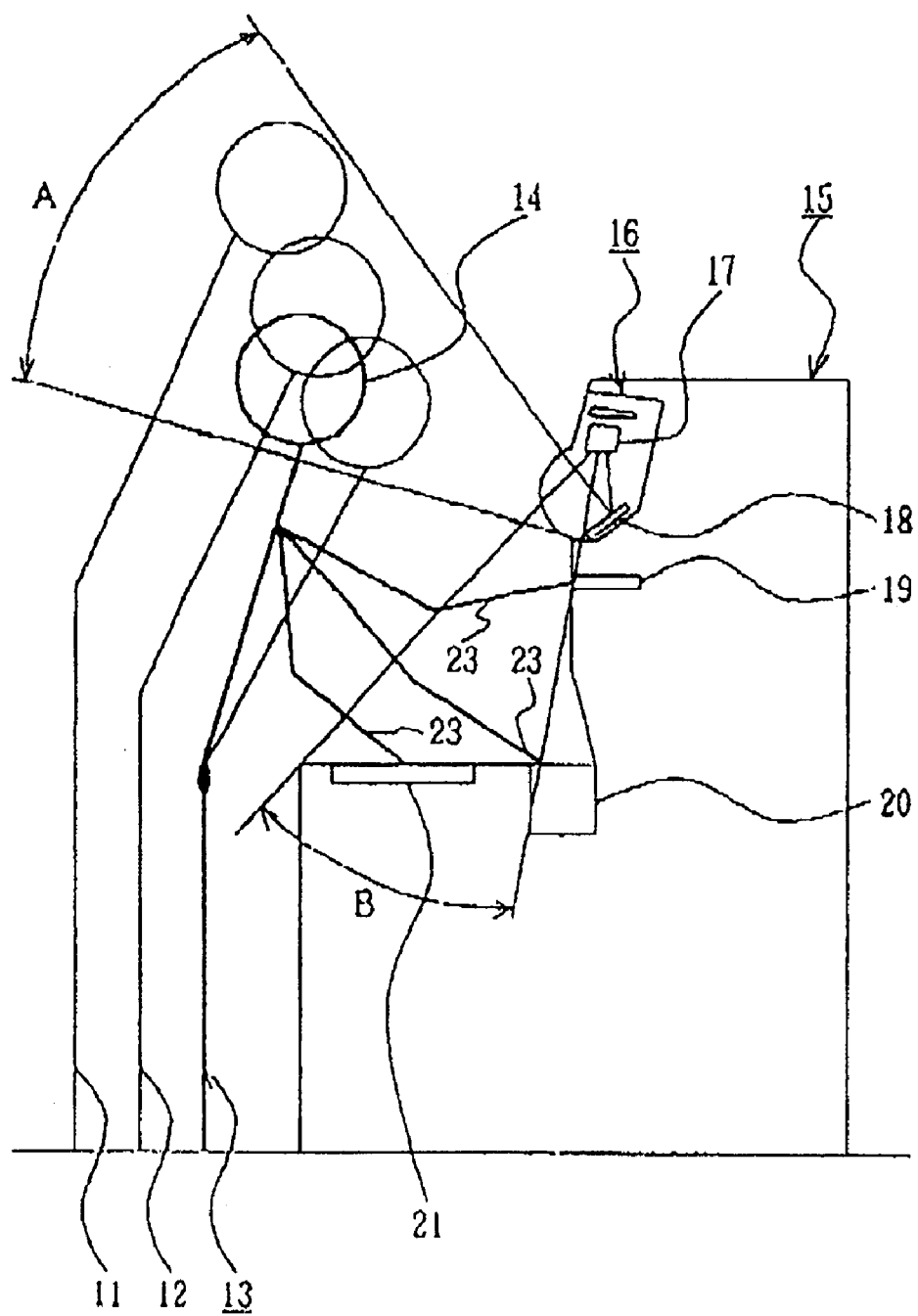
FIG. 1 is a side view of an automated-teller machine wherein a first embodiment of a photographing apparatus according to the invention is mounted.

The invention is intended to store in memory means an image of the face of a user of a transaction processing unit, in association with an image of the body of the user, so as to provide sufficient capability of giving proof of a crime.

A monitoring system according to the invention comprises a transaction processing unit, and a photographing apparatus for photographing the user of the transaction processing unit. The transaction processing unit is equipped with a camera with lenses as image pickup means, and the camera with the lenses photographs at a time the face of the user, and sites of the body of the user, other than the face, for example, a region within reach of the user's hand at a predetermined timing. Then, the transaction processing unit outputs image data of the user photographed, and data concerning the operation of the transaction processing unit to a controller of the photographing apparatus.

The controller can be disposed inside the transaction processing unit, and further, can be rendered integral with a controller of the transaction processing unit. With the photographing apparatus shown in FIGS. 2 and 10, the controller of the photographing apparatus and the controller of the transaction processing unit are integrated into one unit, making up an automatic-teller machine controller 54.

The controller of the photographing apparatus classifies the data concerning the operation of the transaction processing unit according to predetermined items on the basis of various data (for example, transaction customer numbers, serial numbers of the transaction processing unit, transaction content of the transaction processing unit, operation content of the transaction processing unit, time when a photograph is taken, photographing timing, sensor numbers used for providing the photographing timing, sensor types, reaction of sensors, and so forth), which are contained in the data concerning the operation of the transaction processing unit. The controller of the photographing apparatus also records in a recording means the image data of the user photographed so as to correspond with the data concerning the operation of the transaction processing unit as classified.

The controller of the photographing apparatus is capable of reading out specific image data among the image data recorded in the recording means described above from a read-out means (for example, keyboard, card reader, and so forth) disposed in the photographing apparatus. For example, in case a trouble or possible malfeasance deemed to attributable to a wrongful act of a user occurs, a supervisor first operates the read-out means, and inputs such data as the serial number of the transaction processing unit, a time when a photograph is taken, and so forth to the photographing apparatus, whereupon the photographing apparatus retrieves the image data of the user at a time when the trouble occurred from among the image data recorded in the recording means, and display the image data thus retrieved on an image display unit, for example, a monitor. The supervisor then visually checks up the image of the user displayed, and decides whether or not the user is wrongfully using the transaction processing unit. In case the user is found to be wrongfully using the transaction processing unit, the supervisor prints the image of the user by use of an image printing means disposed in the photographing apparatus, and transfers the image data to a recording unit disposed in other systems for recording.

Now, preferred embodiments of the invention are described hereinafter with reference to the accompanying drawings. There are various transaction processing units in the form of an automated-teller machine (ATM), unattended transaction terminal, shopping terminal, vending machine, POS terminal (including a cash register), or so forth. However, the case of the automated-teller machine will be described hereinafter by way of example. Further, since an action of a user's hand directly shows an action of the user, the description given hereinafter will be based on the assumption that the photographing apparatus photographs the hand of the user as a site of the body of the user, to be photographed.

First Embodiment

FIG. 1 is a side view of an automated-teller machine wherein a first embodiment of a photographing apparatus according to the invention is mounted.

In FIG. 1, reference numeral 11 denotes a user tall in height, 12 a user of an average height, 13 a user of a short height, 14 a face of the users 11 to 13, respectively, as a first site of the respective users, to be photographed, and 23 a hand of the users 11 to 13, respectively, as a second site of the respective users, to be photographed. Further, reference numeral 15 denotes an automated-teller machine managed by a financial institution as a manager, 16 a photographing apparatus, 17 a camera with lenses as image pickup means, 18 a mirror as a photographing field angle dividing means, and a reflective member, 19 a 5 card slot for inserting a card (not shown) such as a bank card, and so forth therein or removing the same therefrom, 20 a bank note slot for inserting bank notes (not shown) therein or removing the same therefrom, and 21 a CRT provided with touch panels for use as an actuation window. On the CRT 21 panels for various item panels, a numeric panel, and so forth are displayed, and when the users 11 to 13, respectively, press (touch) down on an item or number in a panel, touch panel sensors (not shown) detect the pressed actions. Further, the automated-teller machine 15 is provided with a bankbook slot (not shown) for inserting a bankbook (not shown) therein or removing the same therefrom, adjacent to the card slot 19.

Now, description is given hereinafter of a case where the users 11 to 13, respectively, actuate the automated-teller machine 15, and select withdrawal of cash in executing transaction processing, thereby drawing cash from the automated-teller machine 15.

A menu screen is displayed on the CRT 21 of the automated-teller machine 15, provided with the touch panels, and various items to enable the users 11 to 13 to actuate the automated-teller machine 15 are displayed on the menu screen.

In accordance with guidance shown in the menu screen or audio guidance, the users 11 to 13, respectively, take a first step of touching an item "withdrawal" on the touch panels of the CRT 21.

Next, the users 11 to 13, respectively, take a second step of inserting a card into the card slot 19, and a third step of inputting a personal identification number by touching the numeric touch panel of the CRT 21. The personal identification number inputted is transmitted from the automated-teller machine 15 to a host computer (not shown) wherein it is checked against the personal identification number registered according to the card. When the results of checking indicate that the personal identification number inputted matches up with the personal identification number registered according to the card, the host computer transmits an enabling signal to the automated-teller machine 15, whereupon the automated-teller machine 15 is authorized to allow the following operation to be executed.

Subsequently, the users 11 to 13, respectively, take a fourth step of inputting a desired amount of cash to be withdrawn by pressing the numeric panel. As a result, after a given processing is performed by the automated-teller machine 15, cash in the amount inputted is dispensed from the bank note slot 20. Thereafter, the users 11 to 13, respectively, take a fifth step of taking the cash out of the bank note slot 20.

Thus, the users 11 to 13, respectively, are able to withdraw the cash by taking the first to fifth steps. In the meantime, the face 14 and the hand 23 of the users 11 to 13, respectively, are photographed by the camera 17 with the lenses, and the image data of the face 14 and the hand 23 which are photographed are recorded in the photographing apparatus 16 in such a way as to correspond with the transaction processing by the automated-teller machine 15. In particular, the image data of the face 14 and the hand 23, corresponding with the operation in the second, third, and fifth steps, are recorded as important image data.

With this embodiment of the invention, the photographing apparatus 16 is disposed in the upper part of the automated-teller machine 15 so as to face the card slot 19, the bank note slot 20, and the CRT 21 provided with the touch panels. The photographing apparatus 16 is equipped with one unit of the camera 17 with the lenses and the mirror 18, which are disposed in the following fashion, thereby enabling the face 14 and the hand 23 of the users 11 to 13, respectively, to be simultaneously photographed.

That is, one unit of the camera 17 with the lenses is disposed such that the optical axis thereof is aligned in the direction of the hand or the face of the users so as to be able to photograph the hand or the face of the users, and the mirror 18 is disposed halfway along the optical axis such that the face or the hand of the users is reflected on the reflective surface thereof as seen from the direction of the optical axis. More specifically, the camera 17 with the lenses is installed at a position in the upper part of the automated-teller machine 15, close to the front edge thereof, such that an image of the hand of the user, operating at the card slot 19, the bank note slot 20, and the CRT 21 provided with the touch panels, falls into the upper half of a photographing field angle of the camera 17 with the lenses. Meanwhile, the mirror 18 is disposed at a predetermined position (below the camera 17 with the lenses, but above the card slot 19, the bank note slot 20, and the CRT 21 provided with the touch panels) halfway along an optical axis interconnecting the lenses of the camera 17 with the lenses and a CCD as an image forming element having an image forming face (not shown) so as to be inclined at a predetermined angle such that the face or the hand of the user is reflected on the reflective surface as seen from the direction of the optical axis. As a result, the photographing field angle of the camera 17 with the lenses is divided into angles A and B by the mirror 18, so that the face 14 of the users 11 to 13, respectively, is photographed within the photographing field angle A while the hand 23 of the users 11 to 13, respectively, is photographed within the photographing field angle B.

Thus, with one unit of the camera 17 with the lenses, the face 14 and the hand 23 of the users 11 to 13, respectively, can be simultaneously photographed, and consequently, it becomes unnecessary to install a camera for every site of the body of the user, to be photographed, such as a camera used exclusively for the face of the users, a camera used exclusively for the hand of the users, and so forth, making it possible to lower the cost of the photographing apparatus and to reduce the size thereof at the same time. Also, since the face 14 and the hand 23 of the users 11 to 13, respectively, can be captured in one image frame, image 5 data to be recorded for one case can be reduced to that extent, so that it is possible to twice as much store image data as in the conventional case with the same storage capacity.

Further, in the case of monitoring from a remote location actions of the users 11 to 13 who utilize the automated-teller machine 15 by displaying the image data of the face 14, the hand 23, and so forth, photographed with the photographing apparatus 16, on a monitoring system (not shown) disposed at the remote location, an image of the face 14 and an image of the hand 23 can be simultaneously displayed on one unit of a monitor without use of an image processing unit. Accordingly, this can contribute to lowering of the cost of the photographing apparatus.

With reference to operation in the first to fifth steps described above, a method of generating the image data for the face 14 and the hand 23 of the users 11 to 13, respectively, is described hereinafter.

Figure 2:
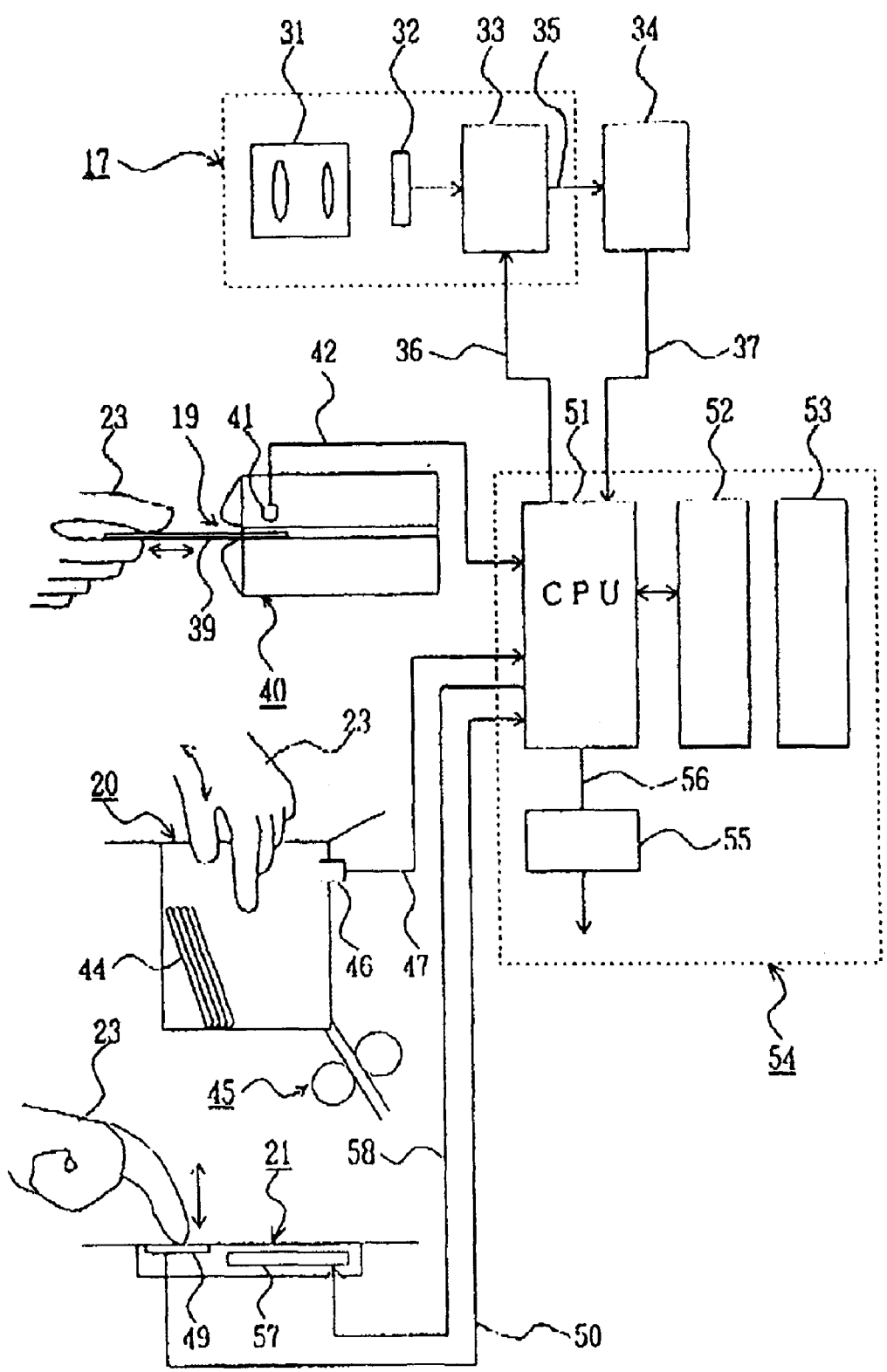
FIG. 2 is a block diagram of the first embodiment of the photographing apparatus according to the invention.
Figure 3:
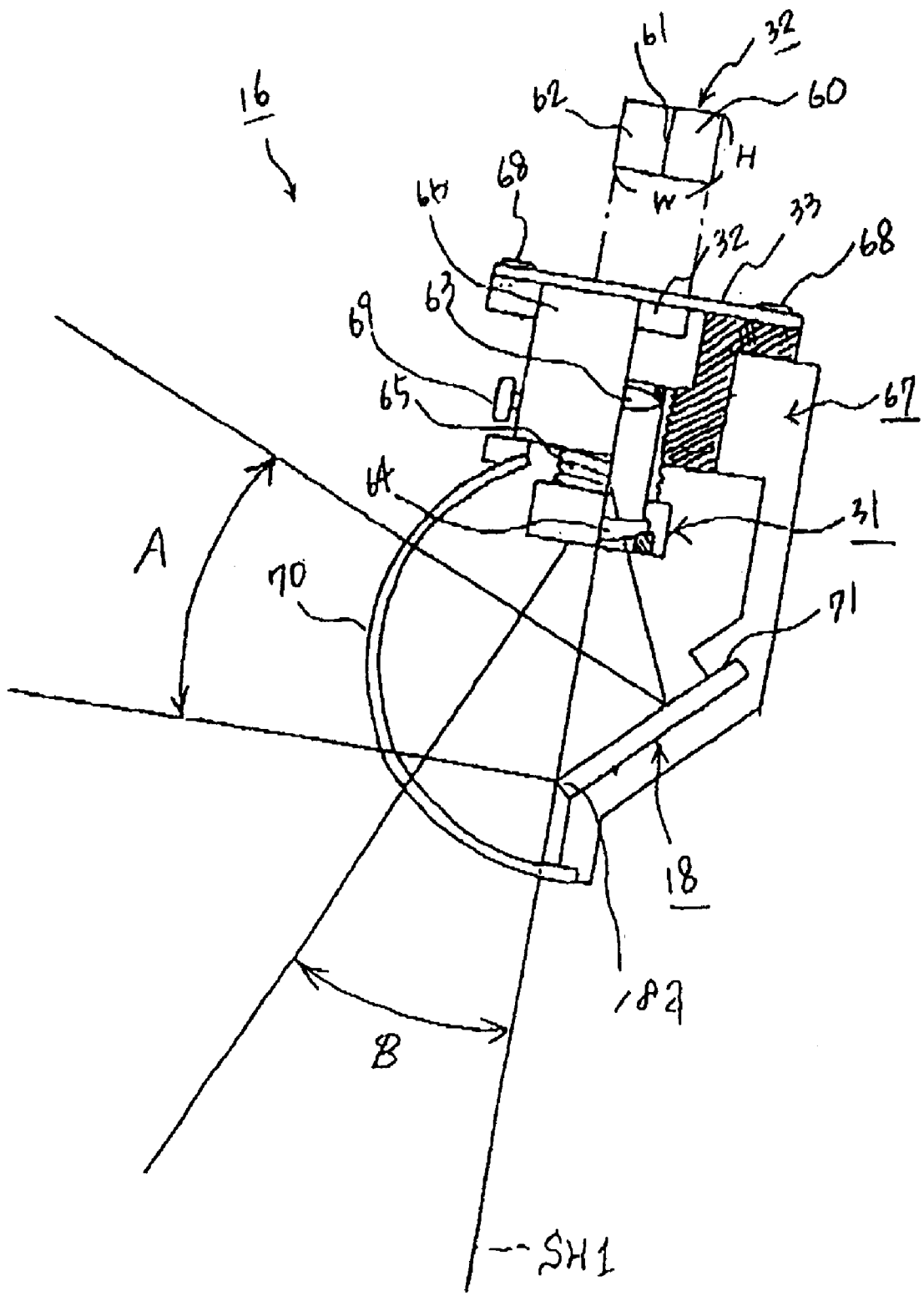
FIG. 3 is a sectional view of the first embodiment of the photographing apparatus according to the invention.

FIG. 2 is a block diagram of the first embodiment of the photographing apparatus according to the invention, and FIG. 3 is a sectional view of the first embodiment of the photographing apparatus according to the invention.

In these figures, reference numeral 17 denotes a camera with lenses, and the camera 17 with the lenses is provided with a lens unit 31 as a condenser element, a CCD 32 as an image forming element, and a CCD control circuit 33 for controlling the CCD 32 while serving as an image pickup controller for generating video signals based on output of the CCD 32.

Further, reference numeral 34 denotes an image processing circuit as an image data generating means for executing image processing based on the video signals, and generating image data, 35 a video signal line for sending out the video signals from the CCD control circuit 33 to the image processing circuit 34, 36 a photographing timing signal line for sending out a photographing timing signal causing photographing to be executed in the CCD control circuit 33 from a CPU 51 to the CCD control circuit 33, and 37 an image data signal line for sending out the image data generated by the image processing circuit 34 to the CPU 51.

Reference numeral 19 denotes a card slot, 23 a hand of users 11 to 13, respectively, 39 a card to be inserted into, or removed from the card slot 19 in the direction of the arrow, 40 a card processing unit, 41 a card detection sensor for detecting the card 39 inserted in the card slot 19, and generating card detection signals, and 42 a card detection signal line for sending out the card detection signals to the CPU 51.

Further, reference numeral 20 denotes a bank note slot, 44 a bank note, 45 a bank note conveyer roller for conveying bank notes from inside of the body proper of the automated-teller machine 15 to the bank note slot 20, 46 a hand detection sensor disposed inside the bank note slot 20 for detecting the hand 23 inserted therein, and generating hand detection signals, and 47 a hand detection signal line for sending out the hand detection signals to the CPU 51.

Reference numeral 21 denotes a CRT provided with touch panels, 49 a touch-panel sensor for detecting when item panels, numeric panel, and so forth, of the CRT 21 provided with the touch panels, are touched, and generating a touch-panel sensor signal, 50 a touch-panel sensor signal line for sending out the touch-panel sensor signal to the CPU 51, 57 a CRT, and 58 an operation directive signal line. The CRT 57 displays predetermined guidance, directives, and so forth on a menu screen based on an operation directive signal sent out by the CPU 51 via the operation directive signal line 58.

Further, reference numeral 54 denotes an automated-teller machine controller. The automated-teller machine controller 54 comprises the CPU 51, a memory 52 as storage means, a power source 53, and an external interface 55. The CPU 51 is connected to an external unit (a unit disposed on the supervisor side of the photographing apparatus 16) which is not shown via a data output line 56 and the external interface 55 to thereby transmit given data to the external unit.

With the photographing apparatus made up as described above, the CPU 51 receives detection signals such as the card detection signals, the hand detection signals, the touch-panel sensor signals, bankbook detection signals, and so forth from the card detection sensor 41 disposed in the card processing unit 40, the hand detection sensor 46 disposed inside the bank note slot 20, the touch-panel sensor 49 disposed in the CRT 21 provided with the touch panels, a bankbook detection sensor disposed in a bankbook processing unit (not shown), respectively, whereupon the CPU 51 sends out the photographing timing signals to the CCD control circuit 33 of the camera 17 with the lenses via the photographing timing signal line 36. The CCD control circuit 33, upon receiving the photographing timing signals, executes control of the CCD 32 according to the photographing timing signals. As a result, the face 14 and the hand 23 of the users 11 to 13, respectively, are photographed by the camera 17 with the lenses.

The images of the face 14 and the hand 23 of the users 11 to 13, respectively, are formed in the CCD 32 by the lens unit 31, and output of the CCD 32 is read in by the CCD control circuit 33 at the timing of the photographing timing signals to be converted into video signals. In this case, the image formation face of the CCD 32 is divided into a CCD region 60 for photographing the hand and a CCD region 62 for photographing the face, however, the CCD control circuit 33 fetches the output of the CCD 32 along the scanning lines of the CCD 32, making no distinction between the CCD region 60 for photographing the hand and the CCD region 62 for photographing the face. Then, the video signals are sent out to the image processing circuit 34, and converted therein into image signals which are predetermined video specification signals (luminance signals and color difference signals according to the NTSC method, digital signals as specified in IEEE1394 etc., or signals of USB specification, and so forth) on the basis of the specification of respective financial institutions supervising the automated-teller machine 15 to be sent out to the CPU 51 in the form of image data.

Subsequently, the CPU 51 applies data processing such as image compression processing, encryption processing, and so forth, corresponding with the specification of the respective financial institutions to the image data of the face 14 and the hand 23 of the users 11 to 13, respectively. The CPU 51 then stores in the memory 52 the image data to which the data processing has been applied. At this point in time, the CPU 51 provides the image data with additional information such as data indicating a time and date when photographing is executed, a code indicating type of transaction processing, a code indicating action content, a sensor identification flag for indicating which sensor has been activated, data indicating which photographing timing is involved, and so forth before storing the image data. The CPU 51 then retains and manages the image data and the additional information added thereto. Accordingly, at a later time when reading out the image data, the CPU 51 is able to read out the image data from the memory 52 on the basis of the additional information.

Now, since the storage capacity of the memory 52 has its limit, the financial institutions managing the automated-teller machine 15 may operate an external management apparatus (not shown), and cause the same to gain access to the CPU 51 periodically via the external interface 55, thereby reading out the image data and the additional information added thereto, stored in the memory 52, so that these data read out are transferred to the external management apparatus.

The photographing apparatus 16 is set up to monitor actions deemed as important subjects of monitoring by giving priority thereto among various actions of the users 11 to 13.

For example, the photographing apparatus 16 monitors an action of the users 11 to 13, respectively, inserting the card 39 into the card slot 19 as one of the actions deemed to be the important subjects of monitoring. This is because who started a transaction action needs to be kept on record. Monitoring is executed such that the card detection sensor 41 disposed in the card slot 19 detects insertion of the card 39 in the card slot 19, and starting from this point in time, the photographing apparatus 16 photographs the face 14 and the hand 23 of the users 11 to 13, respectively. Photographing at this time is executed by activation of the camera 17 with the lenses regardless of a condition of access (for example, the posture, orientation, and so forth of the users 11 to 13) to the automated-teller machine 15, made by the users 11 to 13.

Further, the photographing apparatus 16 monitors an action of the users 11 to 13, respectively, pulling the card 39 out of the card slot 19 as one of the actions deemed to be the important subjects of monitoring. This is because in case the users forgot to remove the card 39, and the card 39 was taken away by another person, who took away the card 39 needs to be kept on record. Monitoring is executed such that the card detection sensor 41 disposed in the card slot 19 detects pullout of the card 39 from the card slot 19, and starting from this point in time, the photographing apparatus 16 photographs the face 14 and the hand 23 of the users 11 to 13, respectively. Photographing at this time as well is executed by activation of the camera 17 with the lenses regardless of the condition of access to the automated-teller machine 15, made by the users 11 to 13.

Also, the photographing apparatus 16 monitors an action of the users 11 to 13, respectively, setting a bank note 44 into the bank note slot as one of the actions deemed to be the important subjects of monitoring. This is because in case someone threw in a counterfeit note (or counterfeit coin) and a foreign article, who threw in these needs to be kept on record. Monitoring is executed such that the hand detection sensor 46 disposed inside the bank note slot 20 detects setting of the bank note 44 into the bank note slot 20, and starting from this point in time, the photographing apparatus 16 photographs the face 14 and the hand 23 of the users 11 to 13, respectively. Further, the photographing apparatus 16 monitors an action of the users 11 to 13, respectively, taking the note 44 out of the bank note slot 20 as one of the actions deemed to be the important subjects of monitoring. This is because a person who withdrew the note from an account needs to be kept on record. Monitoring is executed such that the hand detection sensor 46 disposed inside the bank note slot 20 detects removal of the bank note 44 out of the bank note slot 20, and starting from this point in time, the photographing apparatus 16 photographs the face 14 and the hand 23 of the users 11 to 13, respectively. Photographing at this time as well is executed by activation of the camera 17 with the lenses regardless of the condition of access to the automated-teller machine 15, made by the users 11 to 13.

Now, the automated-teller machine 15 is able to monitor an action of the users 11 to 13, respectively, touching the CRT 21 provided with the touch panels as one of the actions deemed to be the important subjects of monitoring. The item panels, numeric panel, and so forth are displayed on the CRT 21 provided with the touch panels, and the item panels include various operation such as selection of transaction processing, inputting of a personal identification number, inputting of a cash amount, inputting of confirmation, inputting of a payee, and so forth. Every time when the item panels, numeric panel, and so forth are touched, the automated-teller machine 15 detects such a touch by means of the touch-panel sensor 49 and sends out the touch-panel sensor signal to the CPU 51 via the touch-panel sensor signal line 50. The CPU 51, upon receiving the touch-panel sensor signal, generates the photographing timing signal, causing the camera 17 with the lenses to execute photographing.

In this connection, if the photographing timing signal is generated for all the touch-panel sensor signals, the automated-teller machine 15 will end up in photographing even actions deemed to be unimportant subjects of monitoring by the financial institutions. It follows therefore that the automated-teller machine 15 will store useless image data in the memory 52, and as a result, free space of the memory 52 will be used up in a short period of time. Accordingly, it is desirable that the financial institutions specify beforehand actions deemed to be important subjects of monitoring, and set up a program in the CPU 51 of the automated-teller machine 15 such that photographing is to be executed only when the actions deemed to be important subjects of monitoring are taken.

For example, an action of the users 11 to 13 when the CRT 21 provided with the touch panels indicates a display "Input a personal identification number" is very important in transaction processing. The reason for this is because the financial institutions need an evidence showing that transaction processing has been executed by the owner of the card 39, and since no one but the owner of the card 39 knows, in principle, his personal identification number, inputting of the personal identification number provides the evidence that the transaction processing has been executed by the owner of the card 39. Also, for example, an action of the users 11 to 13 when the CRT 21 provided with the touch panels indicates a display "Input a cash amount" is very important as well in transaction processing. The reason for this is because such a display is intended to cause a payment transaction to be executed, and in case a malfunction occurs at the time of the payment transaction, the financial institutions will end up in suffering a huge loss.

Hereinafter, the photographing apparatus 16 is described.

In FIG. 3, reference numeral 16 denotes a photographing apparatus installed in a forward-leaning manner and facing downward, 18 a mirror installed in a forward-leaning manner and facing upward, 31 a lens unit, 32 a CCD, 33 a CCD control circuit, 60 a CCD region for photographing the hand 23, 61 a boundary line, 62 a CCD region for photographing the face 14, 63 a rear end lens, 64 a front end lens, 65 a lens-barrel, 66 a lens mount, 67 a mirror frame, 68 CCD substrate fixing screws for securely holding the CCD 32, 69 lens fixing screws for securely holding the lens unit 31, and 70 a cover for covering up the mirror 18 and the lens unit 31, and so forth.

In FIG. 3, the side face and the image forming face of the CCD 32 are shown. Normally, the CCD 32 has an aspect ratio, that is, H:W at 3:4. Accordingly, in the case where actions of the users 11 to 13, in the direction of the height of the automated-teller machine 15, need to be monitored, the angles A, B of photographing field of the camera 17 with the lenses can be enlarged by installing the CCD 32 in such a way as to face in the direction shown in FIG. 3.

The mirror 18 is installed in front of the lens unit 31, and is disposed that a tip 18a thereof is tangent to an optical axis SH1 at the center of the angles A, B of photographing field of the camera 17 with the lenses. As a result, two images divided along the optical axis SH1 are formed on the CCD 32 in the following manner. More specifically, the image of the face 14 within the angle A of photographing field falls on the mirror 18 in a slanting and downward direction from above, is reflected by the mirror 18, is then sent out upward via the lens unit 31 to be thereby formed in the CCD region 62 of the CCD 32, for photographing the face. On the other hand, the image of the hand 23 within the angle B of photographing field falls on the mirror 18 in a slanting and downward direction from above is then sent out upward via the lens unit 31 to be thereby formed in the CCD region 60 of the CCD 32, for photographing the hand.

Meanwhile, a focusing condition of the images of the face 14 and the hand 23 is determined depending on a position of the CCD 32 relative to that of the lens unit 31. With this embodiment of the invention, the lens-barrel 65 has a threaded surface, and the lens-barrel 65 is screwed into the lens mount 66 via the threaded surface. Accordingly, the focusing condition can be adjusted by turning the lens unit 31 against the lens mount 66 to thereby change a distance between the rear end lens 63 of the lens unit 31 and the image forming face of the CCD 32. After adjustment of the focusing condition is completed, the lens unit 31 can be securely attached to the lens mount 66 by tightening up the lens fixing screws 69.

The lens unit 31 is provided with the two lenses, that is, the front end lens 64 and the rear end lens 63. In the case of simultaneously photographing the face 14 and the hand 23 as with the case of this embodiment of the invention, there is the need of setting the angles A, and B of photographing field at a relatively wide angle. For example, assuming that the CCD 32 has a light-receptive size (a distance along the diagonal line of the image forming face) at ⅓ inc., the focal distance of the lens unit 31 needs to be not more than 15 mm, and a sum of the angles A, and B of photographing field needs to be not less than 40°.

Further, the mirror 18 is fitted into a groove 71 of the mirror frame 67, and bonded thereto to be securely held while the CCD control circuit 33 is fixed to the lens mount 66 by the CCD substrate fixing screws 68.

Furthermore, with this embodiment, since the mirror 18 is disposed such that the tip 18a thereof is tangent to the optical axis SH1 of the lens unit 31, the image forming face of the CCD 32 is evenly divided between the CCD region 60 for photographing the hand and the CCD region 62 for photographing the face. It follows therefore that the boundary line 61 is set in the middle (at a position corresponding to ½) of a width W.

Subsequently, monitor images are described hereinafter in the case where the face 14 and the hand 23 of the users 11 to 13, respectively, are photographed after actually mounting the photographing apparatus 16 made up as described in the foregoing in the automated-teller machine 15.

Figure 4:
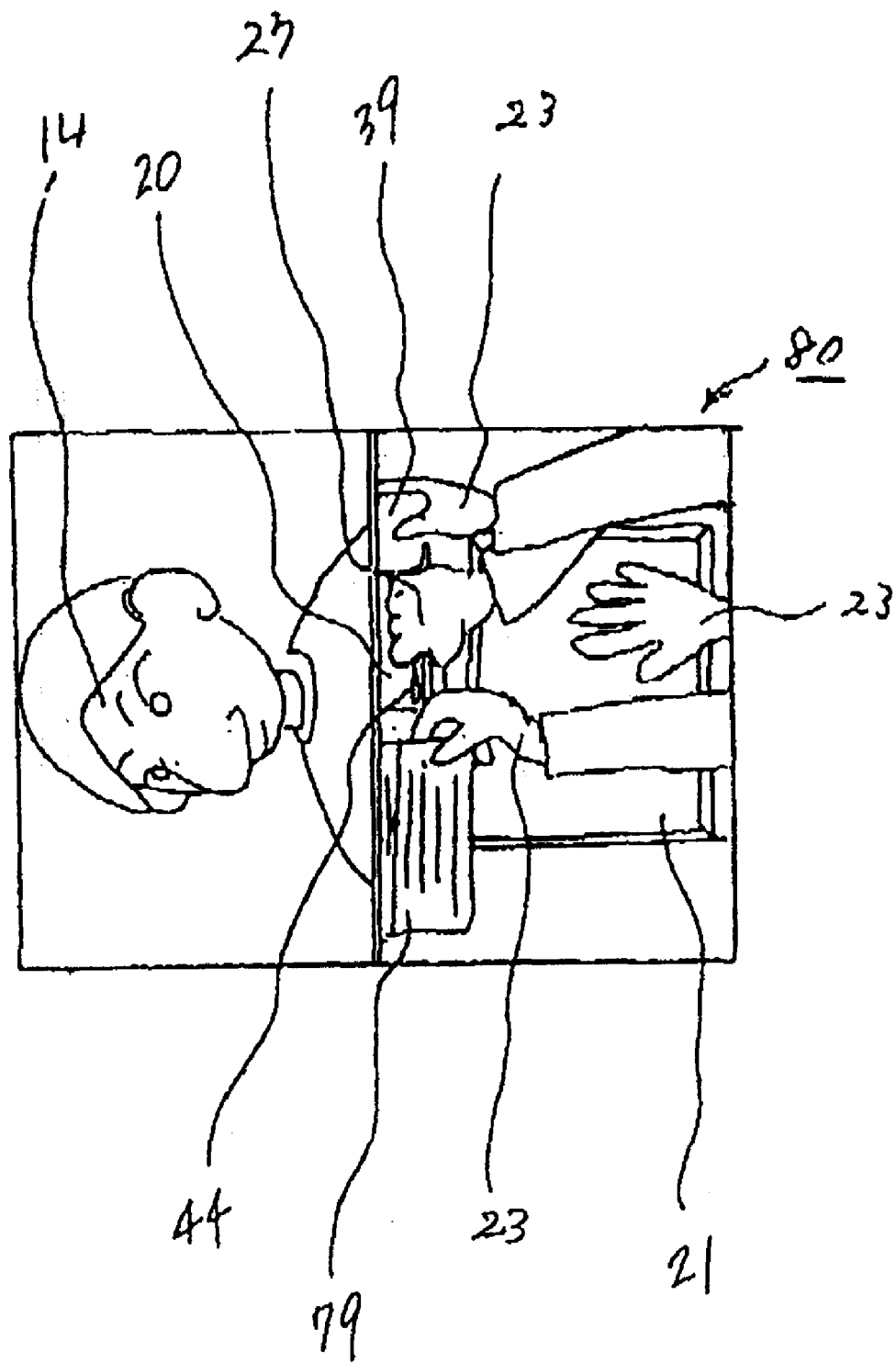
FIG. 4 is a schematic illustration showing a monitored image according to the first embodiment of the invention by way of example.

FIG. 4 is a schematic illustration showing the monitored images according to the first embodiment of the invention by way of example.

In FIG. 4, reference numeral 14 denotes a face, 20 a bank note slot, 21 a CRT provided with touch panels, 23 a hand, 39 a card, 44 a bank note, and 79 a bankbook.

As shown in FIG. 4, a monitor screen 80 is divided into two regions, and the monitored image of the face 14 of the users 11 (FIG. 11) to 13, respectively, is displayed in the region on the left side while the monitored images of the hand 23 and an arm, the card 39, the note 44, the bankbook 79, the CRT provided with the touch panels 21, and so forth are displayed in the region on the right side.

Second Embodiment

With the first embodiment of the invention, the mirror 18 is disposed such that the tip 18a thereof is tangent to the optical axis SH1 of the lens unit 31, and consequently, the image forming face of the CCD 32 is evenly divided between the CCD region 60 for photographing the hand and the CCD region 62 for photographing the face. That is, the boundary line 61 is set at a position corresponding to ½ of a width W.

However, there will arise the necessity of rendering the angle A of photographing field for photographing the face 14 larger or smaller than the angle B of photographing field for photographing the hand 23, depending on the subject of photographing. Further, in the case where the users 11 to 13 have a height extremely short, the users 11 to 13 alter their posture in a large way, or so forth, if the angle A of photographing field is fixed, this will at times prevent the face 14 from being photographed.

A second embodiment of the invention, wherein the angles A, and B of photographing field are rendered adjustable depending on the subject of photographing to overcome such a problem as described above, is described hereinafter. Parts thereof, having the same construction as those of the first embodiment, are denoted by the same reference numerals, and description thereof is omitted.

Figure 5:
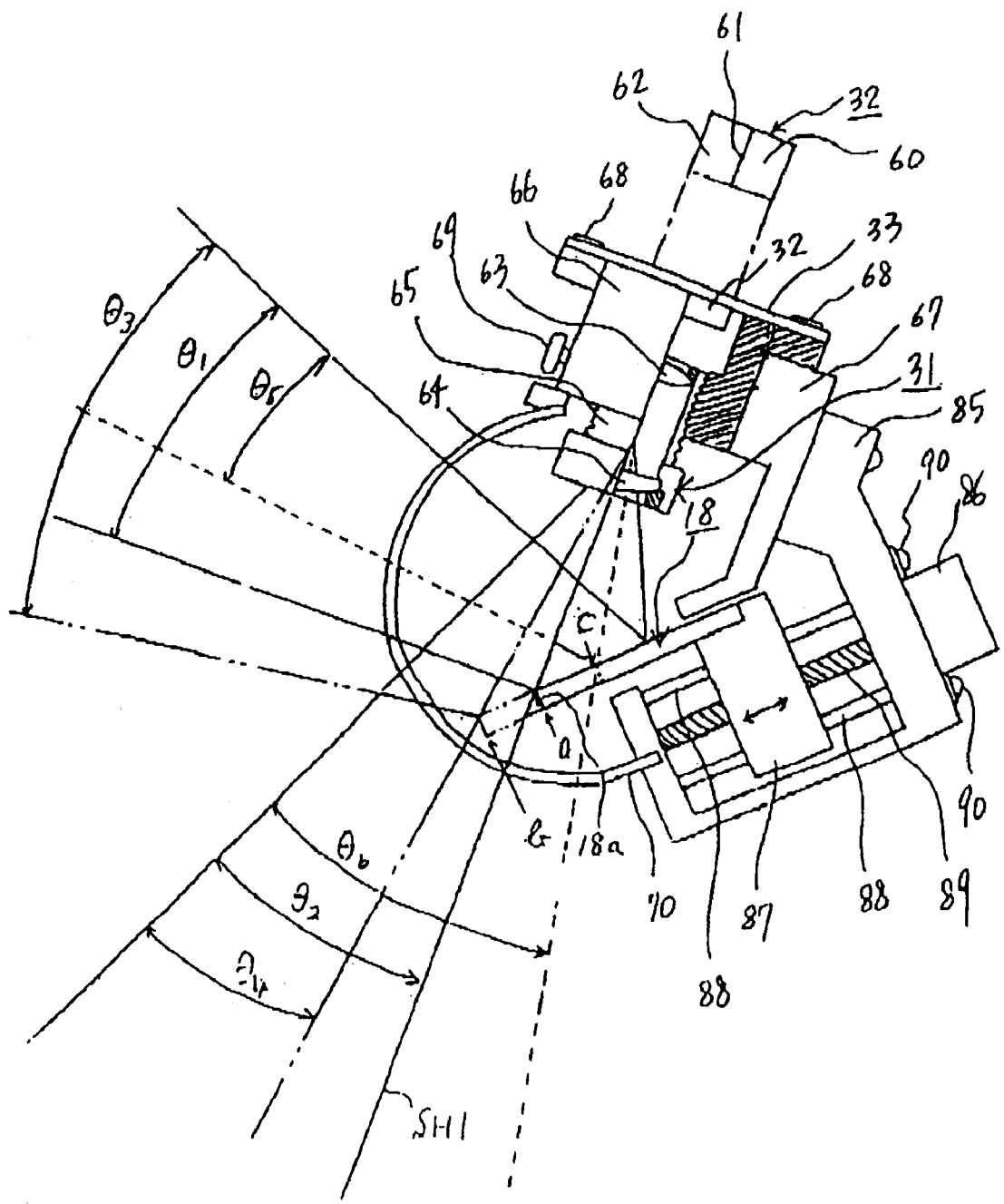
FIG. 5 is a sectional view of a second embodiment of a photographing apparatus according to the invention.

FIG. 5 is a sectional view of a second embodiment of a photographing apparatus according to the invention.

In FIG. 5, reference numeral 85 denotes a mirror-driving frame, 86 a motor as driving means and photographing field angle alteration means for altering a photographing field angle, and 87 a mirror slider disposed slidably in the direction of the arrow for holding a mirror 18 serving as photographing field angle dividing means and a reflective member. The mirror slider 87 is provided with two slider holes (not shown) and one threaded hole (not shown) such that a slider spindle 88 is penetrated through the respective slider holes and a feed screw 89 is mated with the threaded hole. Further, reference numeral 90 denotes motor fixing screws for securely attaching a motor 86 to a mirror driving frame 85.

With this embodiment of the invention, an operator watches a monitor, and decide whether or not the face 14 appearing in a left-side region of a monitor screen 80 is recognizable. In the case where the face 14 does not appear in good condition in the left-side region of the monitor screen 80, the operator drives the motor 86 to thereby turn the feed screw 89, whereupon the mirror slider 87 is moved in the direction of the arrow. This causes the face 14 to appear in good condition in the left-side region of the monitor screen 80. If the tip 18a of the mirror 18 is positioned at a point "a" in the figure, a position of the tip 18a comes into agreement with the optical axis SH1 of the lens unit 31, so that an angle $\theta_1$ of photographing field for photographing the face 14 becomes equal to an angle $\theta_2$ of photographing field for photographing the hand 23. If the tip 18a of the mirror 18 is positioned at a point "b" in the figure, an angle $\theta_3$ of photographing field for photographing the face 14 becomes larger than an angle $\theta_4$ of photographing field for photographing the hand 23. Further, If the tip 18a of the mirror 18 is positioned at a point "c" in the figure, an angle $\theta_5$ of photographing field for photographing the face 14 becomes smaller than an angle $\theta_6$ of photographing field for photographing the hand 23.

Thus, with this embodiment of the invention, since the position of the mirror 18 can be changed by driving the motor 86, the photographing field angle for photographing the face 14 and the photographing field angle for photographing the hand 23 can be adjusted. Also, when the users 11 to 13 have a height extremely short or the users 11 to 13 alter their posture in a large way, it is possible to photograph the face 14 satisfactorily by enlarging the photographing field angle for photographing the face 14 to $\theta_3$.

Further, with this embodiment, by adopting the following constitution, it becomes possible to cause a photographing apparatus 16 in place of the operator to decide whether or not an image of the face 14 of the users 11 to 13 is being photographed in good condition by a camera 17 with lenses. More specifically, image recognition means are installed inside a CPU 51. The image recognition means execute image recognition in accordance with a predetermined algorithmic technique on the basis of image data sent out by an image processing circuit 34. For example, the image recognition means first decide whether or not an image data of a nose is included in the image data, and if the image data of the nose is included, proceed to decide whether or not an image data of eyes is included. The image recognition means make predetermined decisions in this way, and decide based on the results of such decisions whether or not the image of the face 14 has been photographed in good condition. Meanwhile, in the case where the image of the face 14 has not been photographed, the CPU 51 drives the motor 86 to change the position of the mirror 18, thereby adjusting the photographing field angle.

Furthermore, the photographing apparatus 16 is capable of checking into the identity of the users 11 to 13 by executing processing described as follows, and suspending a transaction depending on the results of such checking or sounding an alarm.

For example, the photographing apparatus 16 acquires biometrical data such as the image data, iris data, and the like of the face 14 of the users 11 to 13 from a host computer (not shown) and the card carried by the users, and store the biometrical data in a memory 52 while producing biometrical data from the image data of the face 14 of the users 11 to 13 which is photographed, thereby checking the biometrical data of the users, produced, against the biometrical data stored.

With this embodiment of the invention, the position of the mirror 18 is unidimensionally changed by moving the mirror 18 linearly, however, it is also possible to change the position of the mirror 18 is multidimensionally by moving the mirror 18 multidirectionally. In addition, with this embodiment, it is possible even to change an angle at which the mirror 18 is fixedly attached by rotatably reciprocating the mirror 18.

Furthermore, with this embodiment, two monitored images are displayed on the monitor screen 80 by dividing the image forming face of the CCD 32 into two regions, however, it is also possible to display three or more monitored images on the monitor screen 80 by dividing the image forming face of the CCD 32 into three or more regions.

Still further, it is desired that the photographing apparatus is capable of taking picture of the face of the users and sites of the users, other than the face, in a size as large as possible.

Accordingly, a third embodiment of the invention is adapted to photographing the face and other sites of the users in a size as large as possible, and the third embodiment is described hereinafter. Parts thereof, having the same construction as those of the embodiments described hereinbefore, are denoted by like reference numerals, and description thereof is omitted.

Third Embodiment

Figure 7:
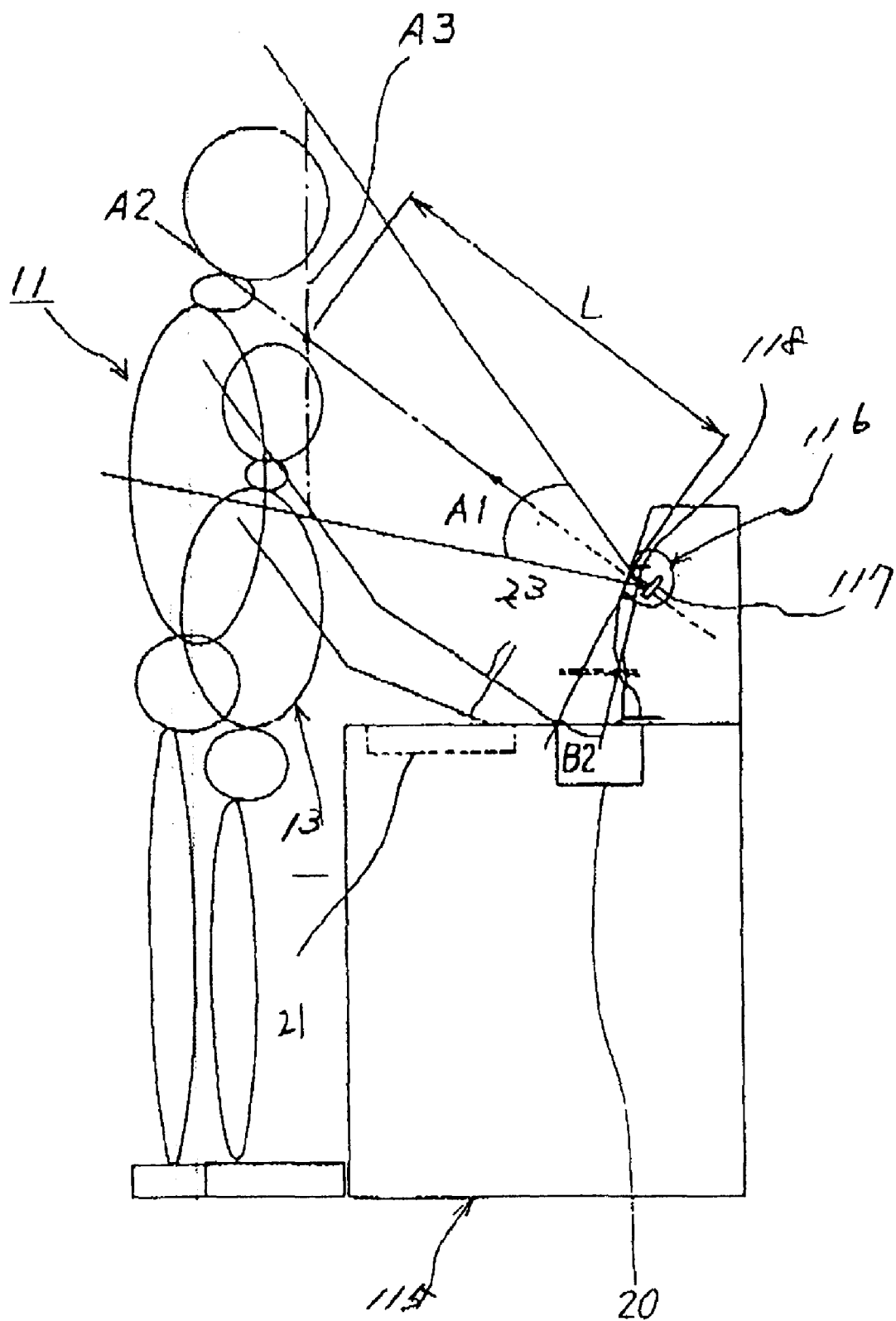
FIG. 7 is a side view of an automated-teller machine wherein the third embodiment of the photographing apparatus according to the invention is mounted.
Figure 8:
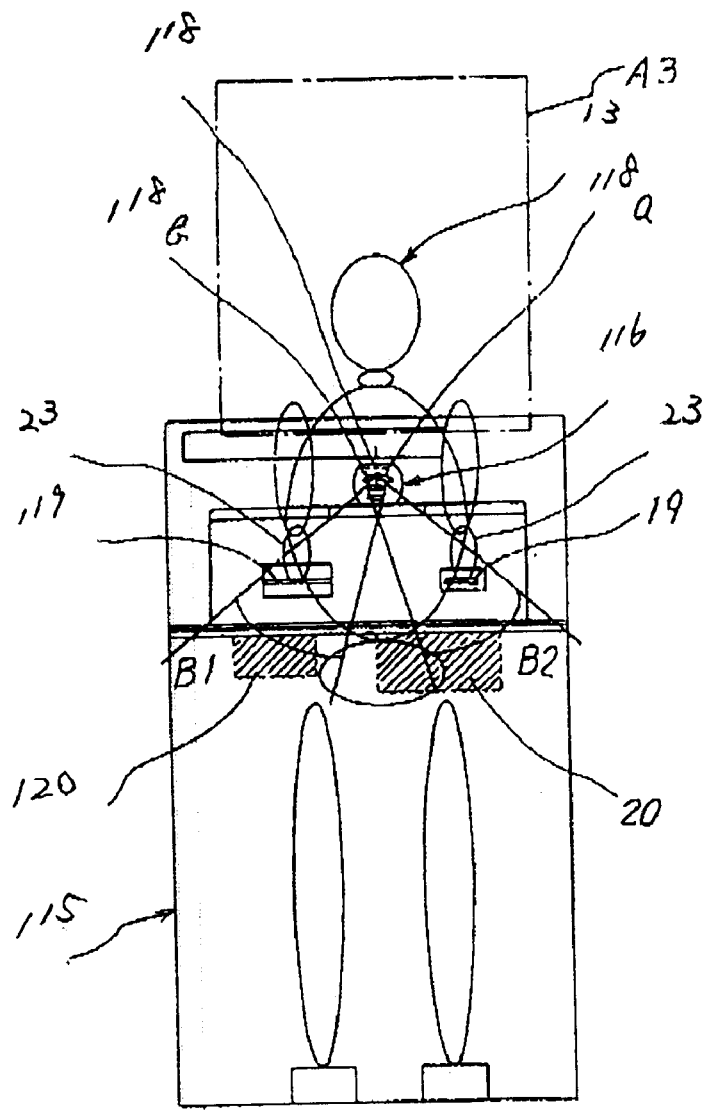
FIG. 8 is a front view of the automated-teller machine wherein the third embodiment of the photographing apparatus according to the invention is mounted.
Figure 9:
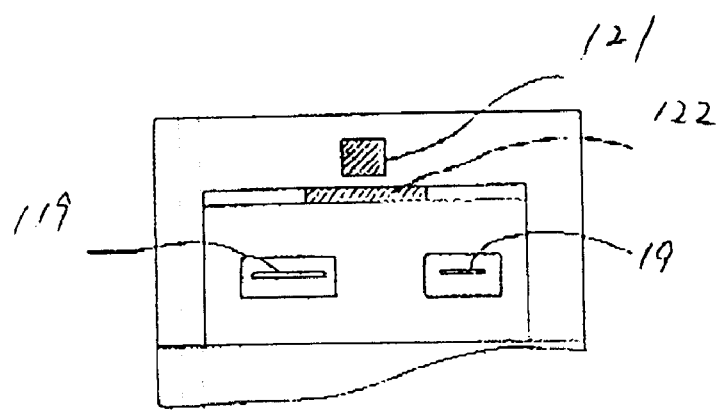
FIG. 9 is a front view of the principal part of the automated-teller machine wherein the third embodiment of the photographing apparatus according to the invention is mounted.

FIG. 7 is a side view of an automated-teller machine wherein a third embodiment of a photographing apparatus according to the invention is mounted; FIG. 8 a front view of the automated-teller machine wherein the third embodiment of the photographing apparatus according to the invention is mounted, and FIG. 9 a front view of the principal part of the automated-teller machine wherein the third embodiment of the photographing apparatus according to the invention is mounted.

In FIG. 7, reference numeral 115 denotes the automated-teller machine managed by a financial institution as a manager, 116 the photographing apparatus, 117 a camera with lenses installed inside the photographing apparatus 116 as image pickup means, 118 a mirror with a surface doglegged in the middle as means of dividing a photographing field angle and a reflective member, 119 a bankbook slot for inserting a bankbook (not shown) therein or removing the same therefrom, 120 a coin slot for inserting coins (not shown) therein or removing the same therefrom, 121 a face 14 photographing window for photographing a face 14 of users as one of sites of the users, to be photographed, and 122 a hand area window for photographing a hand 23 of the users, and the vicinity thereof. The face 14 photographing window 121 and the hand area window 122 are covered with a translucent material in a dark color not to allow the photographing apparatus 116 to be seen from outside.

The photographing apparatus 116 is mounted in a position at the center of the automated-teller machine 115, and provided with one unit of the camera 117 with the lenses, so that the face 14, and the hand 23 of the users 11 to 13 can be simultaneously photographed with the camera 117 with the lenses. The mirror 118 with the surface doglegged in the middle is disposed in front of the camera 117 with the lenses, and a photographing field angle of the camera 117 with the lenses is divided into three photographing field angles, A1, B1, and B2.

The mirror 118 with the surface doglegged in the middle is formed by combining two mirrors, that is, a right mirror 118a and a left mirror 118b, in a doglegged fashion, and has two secular surfaces disposed symmetrically with respect to the optical path of a CCD described hereinafter. The photographing field angle B1 is set by the right mirror 118a of the mirror 118 with the surface doglegged in the middle, and the photographing field angle B2 is set by the left mirror 118b thereof, respectively. As a result, the photographing apparatus 116 is capable of photographing the face 14 of the users 11 to 13 within the photographing field angle A1, the coin slot 120 or the hand 23 of the users 11 to 13, extended to the bankbook slot 119 or the coin slot 120, and so forth within the photographing field angle B1, and a bank note slot 20, the hand 23 of the users 11 to 13, extended to a card slot 19 or the bank note slot 20, and so forth within the photographing field angle B2. However, if needs be, the photographing apparatus 116 is also capable of photographing the bankbook slot 119 within the photographing field angle B1, and photographing the card slot 19 within the photographing field angle B2.

Thus, with the photographing apparatus 116, since the mirror 118 with the surface doglegged in the middle is disposed therein, the photographing field angle A1 and the photographing field angles B1, B2 can be set up independently from each other. Accordingly, the photographing apparatus 116 is capable of setting up the photographing field angle A1 at a large angle in order to photograph the face 14 of the users 11 to 13 at the center thereof, and consequently, can easily cope with differences in height of the users 11 to 13 standing opposite to the automated-teller machine 115.

A2 denotes the optical axis of the camera 117 with the lenses, and A3 a shooting range where photographs can be taken within the photographing field angle A1, as seen from the front side of the photographing apparatus 116. The shooting range A3 is set up at a distance L away from the photographing apparatus 116. Accordingly, as shown in FIG. 7, as the face 14 of the users 11 to 13 are contained within the shooting range A3, it is possible to photograph the face 14 of the users 11 to 13 satisfactorily with the camera 117 with the lenses.

With this embodiment of the invention, for the right mirror 118a and the left mirror 118b, a rectangular and planar mirror identical in shape as well as size is employed, respectively. In addition, with this embodiment, the right mirror 118a and the left mirror 118b are set at an equal tilt, and consequently, not only a construction of the mirror 118 with the surface doglegged in the middle can be simplified but also the photographing field angle B1 can be rendered identical to the photographing field angle B2. As shown in FIG. 8, only half of the bank note slot 20 is photographed, however, since bank notes delivered from the automated-teller machine 115 to the users 11 to 13 are not folded double, it is possible to perform satisfactory monitoring within the photographing field angle B2 on whether or not bank notes are present in the bank note slot 20, and actions of the users 11 to 13 taking out the bank notes.

Further, as shown in FIG. 8, as the photographing field angles B1, B2 extend along the outer rim of a cabinet of the automated-teller machine 115, an effect of the surveillance can be enhanced. With this embodiment, since the respective transaction slots (that is, the bankbook slot 119, the card slot 19, the bank note slot 20, and the coin slot 120) are disposed on respective sides, symmetrically with respect to the center position at which the photographing apparatus 116 is mounted, the mirror 118 with the surface doglegged in the middle is installed so as to be symmetrical centering round the optical path of the CCD described hereinafter. In contrast, in the case where the respective transaction slots are disposed asymmetrically, the mirror 118 with the surface doglegged in the middle is preferably modified such that the tilt of the right mirror 118a and the left mirror 118b, respectively, is changed so as to enable the respective transaction slots to be photographed asymmetrically.

Further, with this embodiment, the mirror 118 with the surface doglegged in the middle is used, however, use may be made of a mirror with a surface concaved in the middle such that the respective transaction slots can be contained in the respective photographing field angles.

Thus, with this embodiment, by disposing the two specular surfaces so as to be symmetrical with respect to the optical path of the CCD, the respective transaction slots are contained in the respective photographing field angles formed by the respective specular surfaces.

Now, a case where the users 11 to 13 selects withdrawal of cash in transaction processing, and withdraws cash is described hereinafter. A menu screen is displayed on a CRT 21 of the automated-teller machine 115, provided with touch panels, and various items for allowing the users 11 to 13 to operate the automated-teller machine 115 are displayed on the menu screen. In accordance with a guidance on the menu screen or an audio guidance, the users 11 to 13 take a first step of touching item "withdrawal" of the touch panels on the CRT 21 provided with the touch panels.

Next, the users 11 to 13 take a second step of inserting a card into the card slot 19, and subsequently, take a third step of touching a numeric panel on the CRT 21 provided with the touch panels, and inputting a personal identification number. The personal identification number inputted is transmitted from the automated-teller machine 115 to a host computer (not shown), and checked against a personal identification number registered corresponding to the card. If results of such checking indicate that there is a match between the personal identification number inputted and the personal identification number registered corresponding to the card, the host computer transmits an enabling signal to the automated-teller machine 115, whereupon the automated-teller machine 115 is authorized to perform the following operation.

Thereafter, the users 11 to 13 take a fourth step of inputting an amount of cash to be withdrawn by pressing the numeric panel. This will cause the automated-teller machine 115 to perform a predetermined processing, and subsequently, the inputted amount of cash is delivered to the bank note slot 20. The users 11 to 13 then take a fifth step of taking cash out of the bank note slot 20.

Thus, the users 11 to 13 are able to withdraw cash by taking the first to fifth steps. In the meantime, the camera 117 with the lenses photographs the face 14, and the hand 23 of the users 11 to 13, and image data of the face 14, and the hand 23 of the users 11 to 13 which are photographed recorded by the photographing apparatus 116, in such a way as to correspond with transaction processing executed by the automated-teller machine 115. In particular, the image data of the face 14 and the hand 23, corresponding to the second, third, and fifth steps described above, are recorded as important image data.

As described hereinbefore, with the photographing apparatus 116, the right mirror 118a and the left mirror 118b are disposed in front of one unit of the camera 117 with the lenses, so that the camera 117 with the lenses has its photographing field angle divided. As a result, the photographing apparatus 116 is capable of simultaneously photographing the face 14 in the photographing field angle A1, for example, a left hand 23 in the photographing field angle B1, and for example, a right hand 23 in the photographing field angle B2. That is, the photographing apparatus 116 is able to photograph the face 14 in the photographing field angle A1 which is sufficient without enlarging the photographing field angle of the camera 117 with the lenses, and at the same time, is able to photograph the hand 23, the bank note slot 20, the coin slot 120, and so forth in the angles B1, B2 of photographing field, set up by the right mirror 118a and the left mirror 118b, respectively.

Accordingly, in case the automated-teller, machine 115 is wrongfully utilized, since a monitoring system is capable of photographing actions of the users 11 to 13, in a region within reach of their hands, actions of the users 11 to 13, making access to the respective transaction slots, and so forth, it can be verified with ease that the automated-teller machine 115 has been wrongfully utilized. Further, the needs of the monitoring system being provided with a plurality of cameras used exclusively for the face 14, the hand 23, and so forth are eliminated, so that not only a cost of the photographing apparatus 116 can be reduced but also a size of the photographing apparatus 116 can be reduced.

Furthermore, with the photographing apparatus 116, since the face 14, the hand 23, and so forth of the users 11 to 13 can be captured in one image frame, image data can be reduced to that extent, to about ½ of a conventional quantity thereof. As a result, with the monitoring system, a storage capacity of a memory (not shown) can be rendered smaller, or if there is no need of reducing the storage capacity, photographing time can be lengthened.

Further, in the case of making surveillance on the actions of the users 11 to 13 who utilize the automated-teller machine 115 by sending out the image data of the face 14, the hand 23, and so forth, photographed at a remote location, to a monitoring unit (not shown) and displaying monitored images on a monitor screen of the monitoring unit, there will be no need of installing the monitoring unit for displaying the face 14, and the hand 23, respectively. That is, since the monitoring system is capable of displaying the face 14 and the hand 23 on one monitor screen without compiling the image data of the face 14, and the image data of the hand 23, an image processing unit can be dispensed with. Accordingly, the cost of the photographing apparatus 116 can be reduced further.

Next, a method of generating the image data of the face 14, the hand 23, and so forth of the users 11 to 13 in the first to fifth steps described in the foregoing is described hereinafter.

Figure 10:
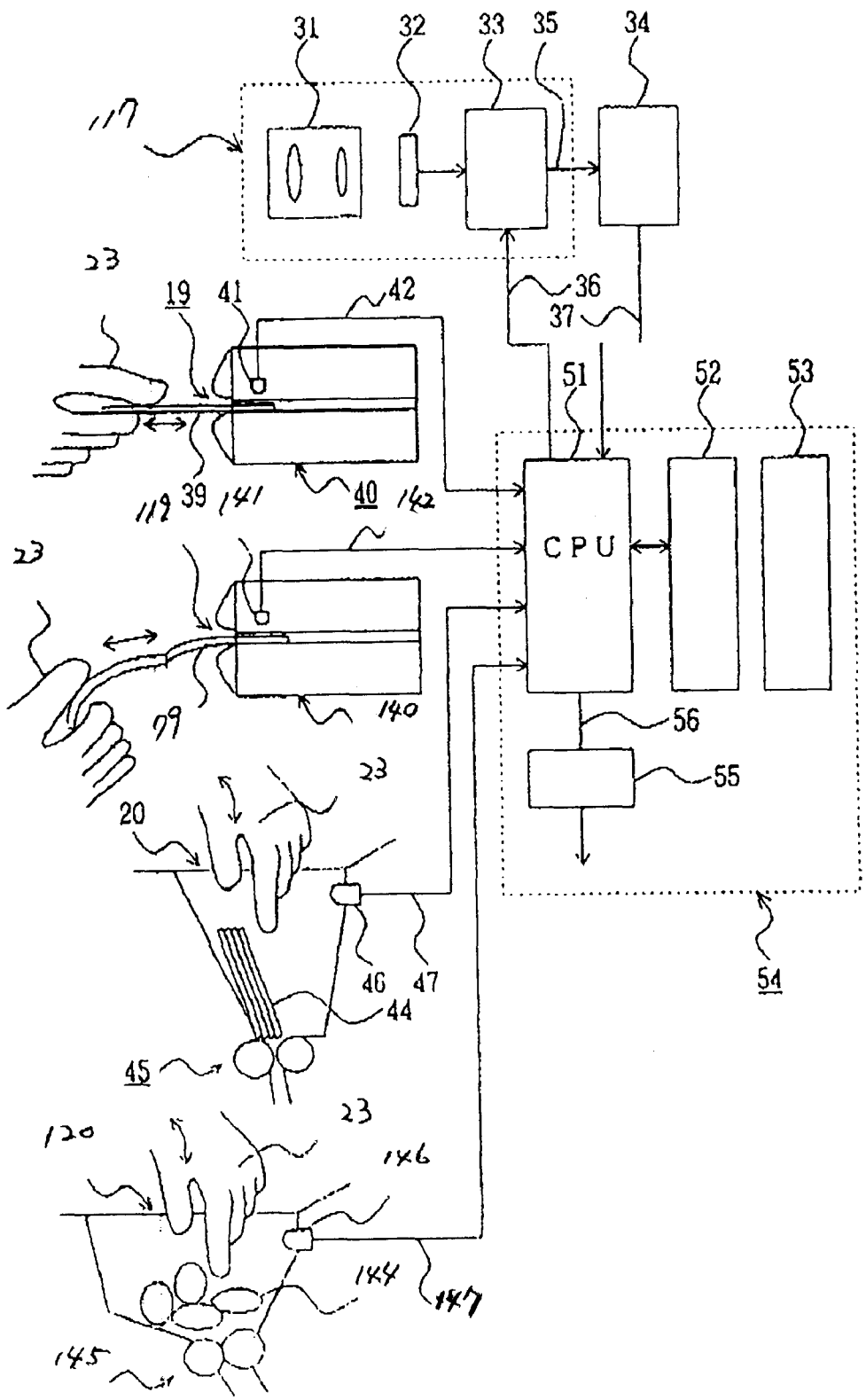
FIG. 10 is a block diagram of the third embodiment of the photographing apparatus according to the invention.

FIG. 10 is a block diagram of the third embodiment of the photographing apparatus according to the invention.

In FIG. 10, reference numeral 117 denotes a camera with lenses, and the camera 117 with the lenses is provided with a lens unit 31 as a condenser element, a CCD 32 as an image forming element, and a CCD control circuit 33 for controlling the CCD 32 while serving as an image pickup controller for generating video signals based on output of the CCD 32.

Further, reference numeral 119 a bankbook slot, 79 a bankbook to be inserted into, or removed from the bankbook slot 119, 140 a bankbook processing unit, 141 a bankbook detection sensor for detecting the bankbook 79 inserted in the bankbook slot 119 and generating a bankbook detection signal, and 142 a bankbook detection signal line for transmitting the bankbook detection signal to a CPU 51.

Further, reference numeral 120 denotes a coin slot, 144 coins, 145 a coin conveyer roller for conveying the coins 144 from inside of the body proper of the automated-teller machine 15 to the coin slot 120, 146 a hand detection sensor disposed inside the coin slot 120 for detecting the hand 23 inserted therein, and generating a hand detection signal, and 147 a hand detection signal line for sending out the hand detection signal to the CPU 51.

With the photographing apparatus 116 made up as described above, the CPU 51 receives detection signals such as the card detection signal, the hand detection signal, the bankbook detection signal, and so forth from the card detection sensor 41, the hand detection sensor 146, the bankbook detection sensor 141, respectively, whereupon the CPU 51 sends out a photographing timing signal to the CCD control circuit 33 via a photographing timing signal line 36. The CCD control circuit 33, upon receiving the photographing timing signal, executes control of the CCD 32 according to the photographing timing signal. As a result, the face 14 and the hand 23 of the users 11 to 13, respectively, are simultaneously photographed by the camera 117 with the lenses.

The images of the face 14 and the hand 23 of the users 11 to 13, respectively, are formed in the CCD 32 by a lens unit 31, and output of the CCD 32 is read in by the CCD control circuit 33 at the timing of the photographing timing signal to be converted into video signals. Then, the video signals are sent out to an image processing circuit 34, and converted therein into image signals which are predetermined video specification signals (luminance signals and color difference signals according to the NTSC method, digital signals as specified in IEEE1394 etc., or signals of USB specification, and so forth) on the basis of the specification of respective financial institutions managing the automated-teller machine 115 to be sent out to the CPU 51 in the form of image data.

Subsequently, the CPU 51 applies data processing such as image compression processing, encryption processing, and so forth, corresponding with the specification of the respective financial institutions to the image data of the face 14 and the hand 23 of the users 11 to 13, respectively. The CPU 51 then stores in the memory 52 the image data to which the data processing has been applied after adding additional information thereto.

Now, since the storage capacity of the memory 52 has its limit, the financial institutions managing the automated-teller machine 115 may operate an external management apparatus (not shown), and cause the same to gain access to the CPU 51 periodically via an external interface 55, thereby reading out the image data and the additional information added thereto, stored in the memory 52, so that these data read out are transferred externally.

Similarly to the photographing apparatus 16, the photographing apparatus 116 is set up to monitor actions deemed as important subjects of monitoring by giving priority thereto among various actions of the users 11 to 13.

For example, the photographing apparatus 116 monitors an action of the users 11 to 13, respectively, inserting a card 39 into the card slot 19 as one of the actions deemed to be the important subjects of monitoring. Also, the photographing apparatus 116 monitors an action of the users 11 to 13, respectively, pulling the card 39 out of the card slot 19 as one of the actions deemed to be the important subjects of monitoring. Further, the photographing apparatus 116 monitors an action of the users 11 to 13, respectively, setting a bank note 44 into the bank note slot 20 as one of the actions deemed to be the important subjects of monitoring. Also, the photographing apparatus 116 monitors an action of the users 11 to 13, respectively, taking a bank note 44 out of the bank note slot 20 as one of the actions deemed to be the important subjects of monitoring.

Further, the photographing apparatus 116 monitors an action of the users 11 to 13, respectively, inserting the bankbook 79 into the bankbook slot 119 as one of the actions deemed to be the important subjects of monitoring. Monitoring is executed such that the bankbook detection sensor 141 disposed inside the bankbook slot 119 detects insertion of the bankbook 79 into the bankbook slot 119, and starting from this point in time, the photographing apparatus 116 photographs the face 14 and the hand 23 of the users 11 to 13, respectively.

Also, the photographing apparatus 116 monitors an action of the users 11 to 13, respectively, pulling the bankbook 79 out of the bankbook slot 119 as one of the actions deemed to be the important subjects of monitoring. This is because in case some of the users forgot to remove the bankbook 79, and the bankbook 79 has been taken away by someone else, it is necessary to keep on record identity of a person who has taken away the same. Monitoring is executed such that the bankbook detection sensor 141 disposed inside the bankbook slot 119 detects pullout of the bankbook 79 out of the bankbook slot 119, and starting from this point in time, the photographing apparatus 116 photographs the face 14 and the hand 23 of the users 11 to 13, respectively.

Further, the photographing apparatus 116 monitors an action of the users 11 to 13, respectively, setting the coins 144 in the coin slot 120 as one of the actions deemed to be the important subjects of monitoring. This is because in case someone threw in counterfeit coins or a foreign article, it is necessary to keep on record identity of a person who threw in these. Monitoring is executed such that the hand detection sensor 146 disposed inside the coin slot 120 detects setting of the coins 144 into the coin slot 120, and starting from this point in time, the photographing apparatus 116 photographs the face 14 and the hand 23 of the users 11 to 13, respectively.

Further, the photographing apparatus 116 monitors an action of the users 11 to 13, respectively, taking the coins 144 out of the coin slot 120 as one of the actions deemed to be the important subjects of monitoring. This is because it is necessary to keep on record identity of a person who withdrew the coins from an account. Monitoring is executed such that the hand detection sensor 146 disposed inside the coin slot 120 detects takeout of the coins 144 out of the coin slot 120, and starting from this point in time, the photographing apparatus 116 photographs the face 14 and the hand 23 of the users 11 to 13, respectively.

Photographing at these times is executed by activation of the camera 117 with the lenses regardless of the condition (for example, the posture and orientation of the users 11 to 13) of access to the automated-teller machine 115, made by the users 11 to 13.

Now, the photographing apparatus 116 records in the memory 52 image data of the face 14 and the hand 23, photographed so as to correspond with operations of the automated-teller machine 115 performing transaction. At this point in time, the photographing apparatus 116 adds predetermined additional information to the forefront part or the rearmost part of the image data before storing the same. With this embodiment, additional information such as data indicating exclusive sensor numbers assigned to the card detection sensor 41, the hand detection sensors 46, 146, the bankbook detection sensor 141, respectively, which are in action when the face 14 or the hand 23 is photographed, data indicating time and date when photographing is performed, data indicating customer numbers, account numbers of the users 11 to 13, card ID numbers, and so forth, designated by respective financial institutions managing the automated-teller machine 115, and data indicating various transaction operation items such as deposit by a card, defrayal by a card, deposit made in a bankbook, withdrawal from a bankbook, money transfer, entry into a bankbook, inquiry for the balance, and so forth are added. A monitoring image database classifying the image data under given conditions is constructed with the additional information. The financial institutions are able to detect predetermined image data by read-out means (not shown) on the basis of the additional information.

Now, details of the photographing apparatus 116 and monitor images are described hereinafter by way of example.

Figure 6:
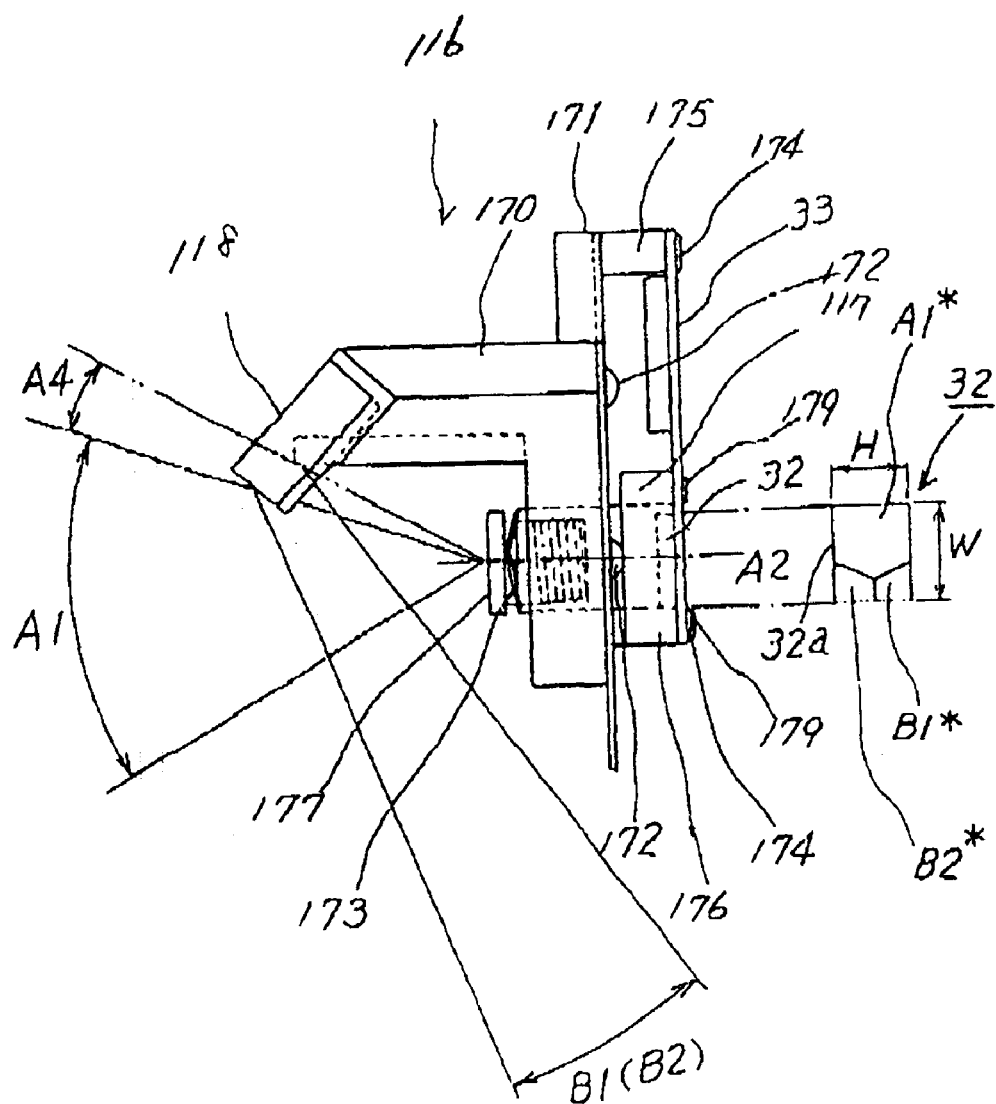
FIG. 6 is a side view of the principal part of a third embodiment of a photographing apparatus according to the invention.
Figure 11:
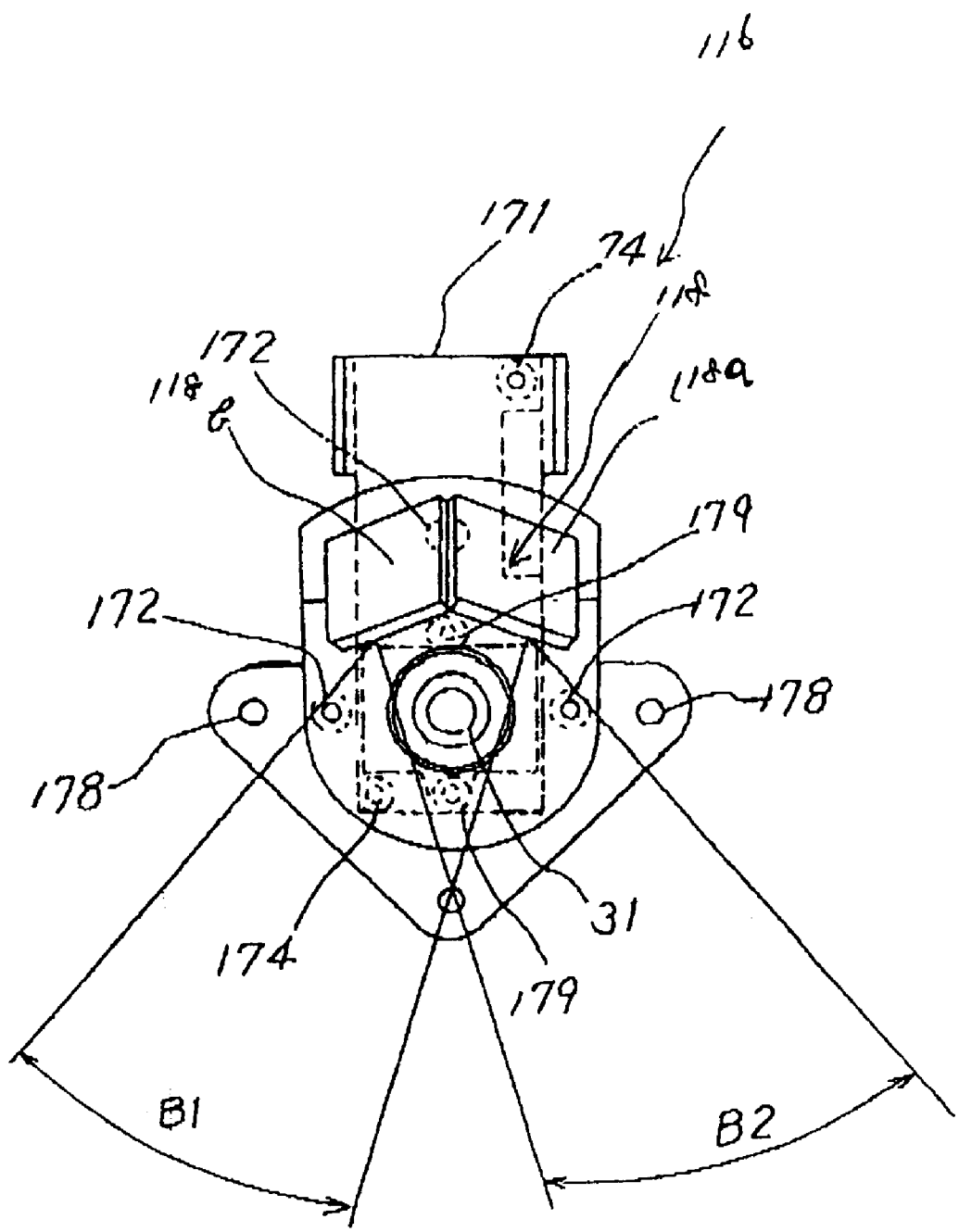
FIG. 11 is a front view of the principal part of the third embodiment of the photographing apparatus according to the invention.
Figure 12:
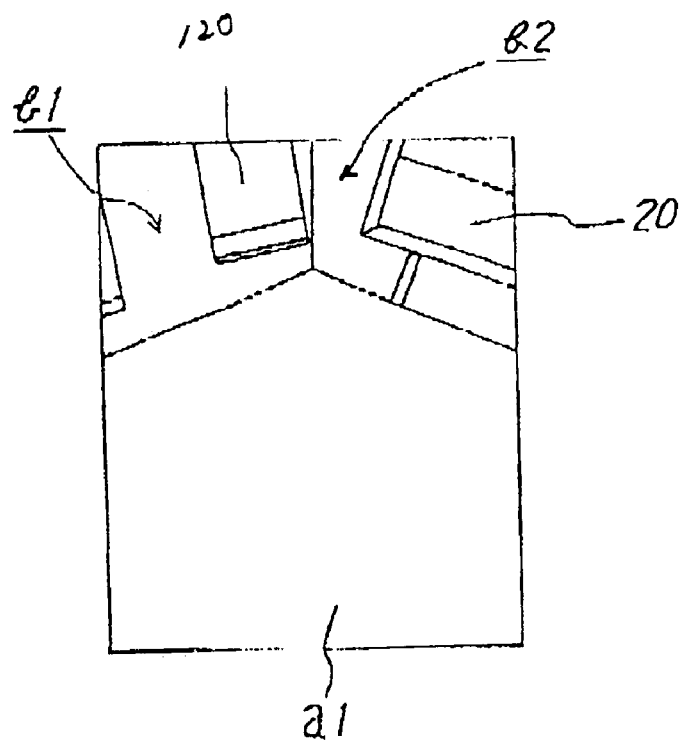
FIG. 12 is a view showing a first example of a monitor image according to the third embodiment of the invention.
Figure 13:
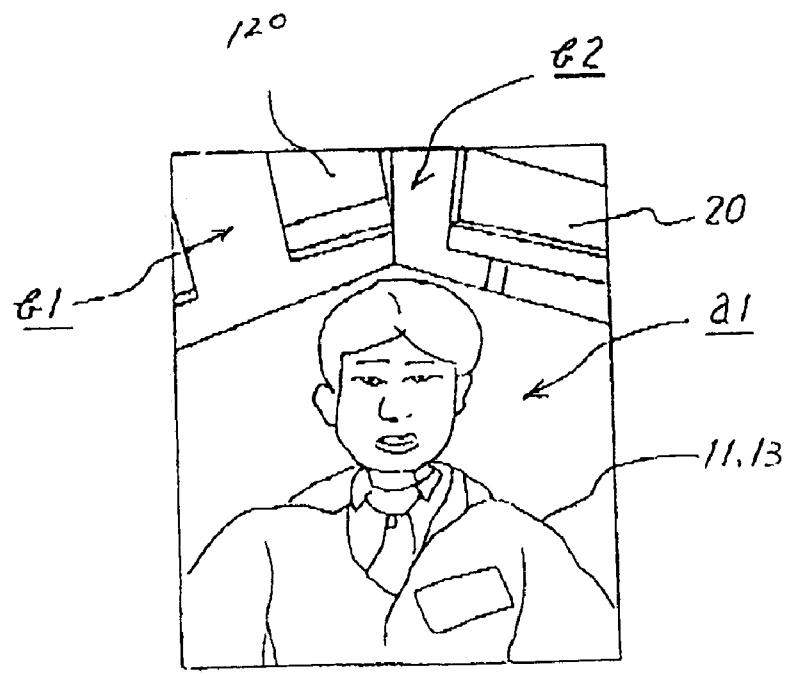
FIG. 13 is a view showing a second example of a monitor image according to the third embodiment of the invention.
Figure 14:
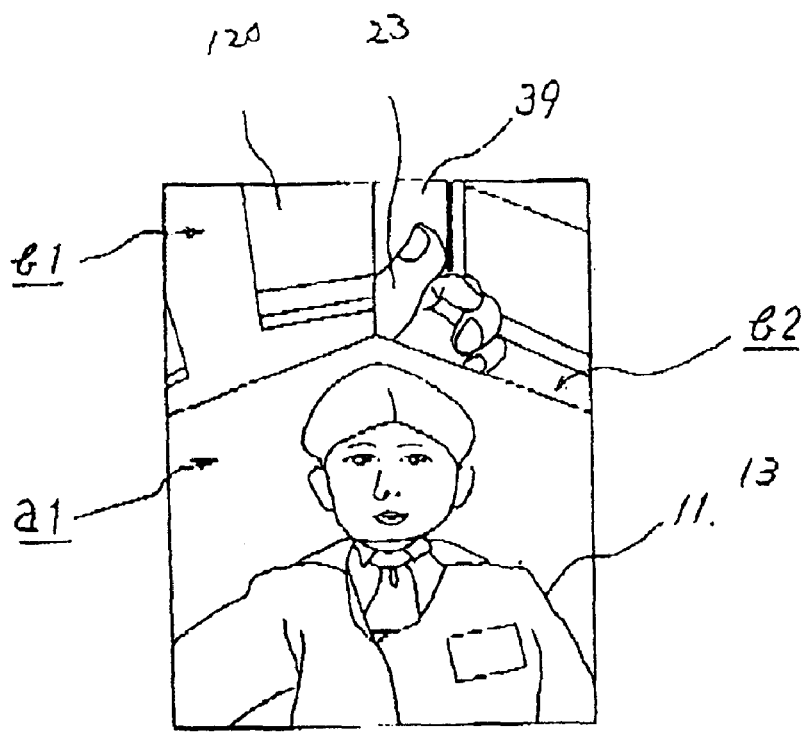
FIG. 14 is a view showing a third example of a monitor image according to the third embodiment of the invention.
Figure 15:
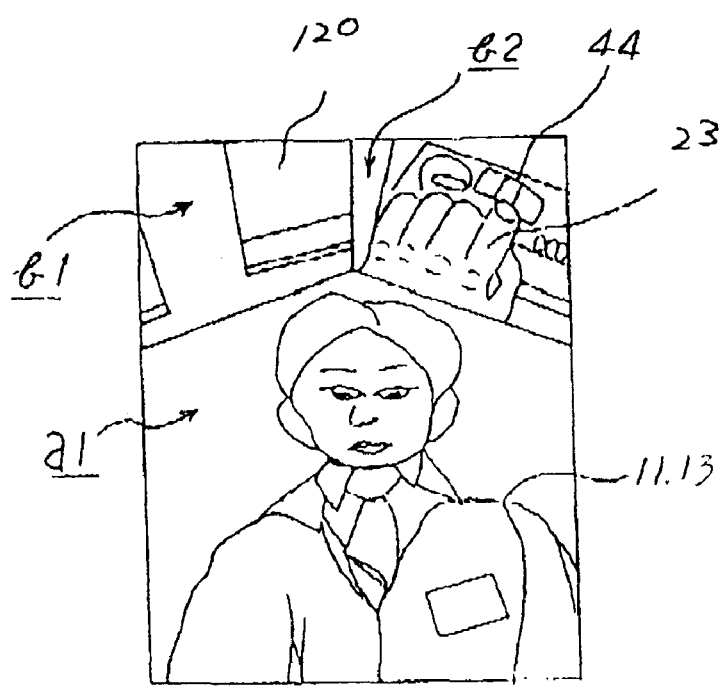
FIG. 15 is a view showing a fourth example of a monitor image according to the third embodiment of the invention.

FIG. 6 is a side view of the principal part of the third embodiment of the photographing apparatus according to the invention, FIG. 11 a front view of the principal part of the third embodiment of the photographing apparatus according to the invention, FIG. 12 a view showing a first example of a monitor image according to the third embodiment of the invention, FIG. 13 a view showing a second example of the monitor image according to the third embodiment of the invention, FIG. 14 a view showing a third example of the monitor image according to the third embodiment of the invention, and FIG. 15 a view showing a fourth example of the monitor image according to the third embodiment of the invention.

In these figures, reference numeral 116 denotes the photographing apparatus, and the photographing apparatus 116 comprises the camera 117 with the lenses, the mirror 118 with the surface doglegged in the middle, made up of the right mirror 118a and the left mirror 118b, the CCD 32, the CCD control circuit 33, a mirror block 170, a main frame 171, mirror block fixture screws 172, a lens adjust spring 173 for backlash removal, a lens mount 176, a lens-barrel 177, and lens attachment holes 178. The mirror block 170 is securely attached to the main frame 171 by three pieces of the mirror block fixture screws 172, the CCD control circuit 33 to the main frame 171 by two pieces of CCD substrate setscrews 174 and a collar 175, and the lens mount 176 to the CCD control circuit 33 by two pieces of screws 179.

Further, the lens-barrel 177 has its peripheral surface provided with threads formed thereon. With the lens-barrel 177, a distance between the rear end face of a lens unit 31 and the CCD 32 is adjusted by turning the lens unit 31, so that focusing of the respective images described above is attained. The lens adjust spring 173 for backlash removal is installed between the lens mount 176 and the lens-barrel 177 so as to eliminate backlash which otherwise develops on the faces to be screwed. The mirror 118 with the surface doglegged in the middle is formed by bonding the right mirror 118a and the left mirror 118b to the tip of the mirror block 170. Thus, the lens unit 31 forms the angles B1, B2 of photographing field from a portion of its original angle (A1+A4) of photographing field, corresponding to the angle A4 of photographing field. In the figure, A2 denotes the optical axis of the lens unit 31.

The CCD control circuit 33 is equipped with the CCD 32 mounted thereon, and image forming regions A1*, B1*, B2*, corresponding to the angles A1, B1, B2 of photographing field, respectively, are formed on the CCD 32. The CCD 32 is mounted longitudinally by disposing the same such that the, upper rim thereof is extended in the vertical direction so that H <W assuming that H represents a height and W represents a width. Accordingly, it is possible to secure the image forming regions A1*, B1*, B2*, formed sufficiently in the direction of the height of the users 11 to 13. If an image of the face 14 (not shown) of the users 11 to 13 is formed in the image forming region A1*, the CCD 32 outputs image data of the face 14 to a monitor unit, if images of the hand 23, the coin slot 120 (see FIG. 10), the bankbook 79, the coins 144, and so forth are formed in the image forming region B1*, the CCD 32 outputs image data of these images to the monitor unit, and if images of the hand 23, the bank note slot 20, the card 39, the bank note 44, and so forth are formed in the image forming region B2*, the CCD 32 outputs image data of these images to the monitor unit. In this connection, a monitor screen of the monitor unit is disposed longitudinally so as to correspond with the direction in which the CCD 32 is disposed.

FIG. 12 is a view showing a monitor image when the users 11 to 13 are not present in front of the automated-teller machine 115. At this point in time, since the users 11 to 13 are not present, a region a1 of the monitor image does not show the face 14 of the users 11 to 13, showing only the automated-teller machine 115 in the background, and a region b1 shows the coin slot 120 and the peripheral region thereof while a region b2 shows the bank note slot 20 and the peripheral region thereof.

FIG. 13 is a view showing a monitor image when the users 11 to 13 stand in front of the automated-teller machine 115, and operate the touch panels at the CRT 21 provided with the touch panels, or wait for response from the automated-teller machine 115. At this point in time, the region a1 shows the face 14 of the users 11 to 13, and the region b1 shows the coin slot 120 and the peripheral region thereof while the region b2 shows the bank note slot 20 and the peripheral region thereof.

FIG. 14 is a view showing a monitor image of the users 11 to 13 inserting the card 39 into the card slot 19 or removing the same therefrom. At this point in time, the region a1 shows the face 14 of the users 11 to 13, and the region b1 shows the coin slot 120 and the peripheral region thereof while the region b2 shows the hand 23 and the card 39.

FIG. 15 is a view showing a monitor image of the users 11 to 13 inserting the bank notes 44 into the bank note slot 20 or removing the same therefrom. At this point in time, the region a1 shows the face 14 of the users 11 to 13, and the region b1 shows the coin slot 120 and the peripheral region thereof while the region b2 shows the hand 23 and the bank notes 44.

Thus, since the face 14, the hand 23, and so forth of the users 11 to 13 can be photographed with one unit of the camera 117 with the lenses, the needs of installing one unit of the camera 117 with the lenses for the face 14, the hand 23, and so forth, respectively, is eliminated. Accordingly, with this embodiment, not only the cost of the photographing apparatus 116 can be reduced but also the size of the photographing apparatus 116 can be reduced. Further, with this embodiment, since the face 14, the hand 23, and so forth can be captured in one image frame, image data thereof can be rendered less to that extent.

Further, with this embodiment, for example, even in the case where it is not possible to provide a large distance between the camera 117 with the lenses and the users 11 to 13 because the automated-teller machines 115 of a downsized type are installed in department stores, convenience stores, and so on, it is possible to enlarge the photographing field angles, A1, B1, and B2, respectively. Accordingly, it is unnecessary to enlarge the photographing field angle of the lens unit 31 with the result that distortion of monitor images, otherwise occurring on the rim of the screen of the monitoring unit, can be prevented. Consequently, in this embodiment, the images of the face 14, the hand 23, and so forth can be recognized with ease. In addition, for the lens unit 31 according to this embodiment, there is no need of using expensive wide-angled lenses, resulting in a lower cost of the photographing apparatus 116.

Further, with the automated-teller machines 115 incorporating the photographing apparatus 116 according to this embodiment of the invention, the face 14, the hand 23, and so forth can be simultaneously photographed, and even in case of a trouble developing, it is possible to cope with the trouble speedily. For example, in case the users 11 to 13 forget recovering the card 39, the bank notes 44, the bankbook 79, the coins 144, and so forth, it is possible to sound an alarm prompting the users 11 to 13 to check. And actions of the users 11 to 13 are kept under surveillance by the photographing apparatus 116, and when the users 11 to 13 turn the face 14 to, or bring the hand 23 close to a given transaction slot among the bankbook slot 119, the card slot 19, the bank note slot 20, the coin slot 120, and so forth, it is possible to take out the card 39, the bank note 44, the bankbook 79, the coins 144, and so forth, respectively. Thus, this will further prevent the users 11 to 13 from forgetting to remove the card 39, the bank note 44, the bankbook 79, the coins 144, and so forth.

Furthermore, with this embodiment, movements of the face 14, the hand 23, and so forth from a time when the users 11 to 13 stand in front of the automated-teller machines 115 until the users 11 to 13 leave the automated-teller machines 115 after completing transaction processing can be simultaneously photographed, and it is therefore possible to check responses of the users 11 to 13 to operation guidance given by the automated-teller machines 115 with the photographing apparatus 116. Also, since the automated-teller machines 115 is capable of offering the operation guidance in step with movements of the face 14, particularly the eyes, and the hand 23 of the users 11 to 13, it is possible for the users 11 to 13 to easily operate the automated-teller machines 115 even if they are at an advanced age, handicapped, or not used to handling the automated-teller machines 115.

Further, in the case where the automated-teller machines 115 are installed in department stores, convenience stores, and so on, if a foreign article is inserted into the bankbook slot 119, the card slot 19, the bank note slot 20, the coin slot 120, and so forth, it is possible to identify a person who has inserted the same.

Then, in case someone other than the genuine owner of the card 39, the bankbook 79, and so forth has used them, and withdrawn cash, it is possible to identify a person who has done that on the basis of not only characteristics of the face 14 and the hand 23 but also characteristics of his or her motion. In addition, it is also possible to identify a person on the basis of his or her more skillful hand, whether or not a finger ring was worn, whether or not the hands were manicured, and so forth. In case cash has been withdrawn by threatening the owner of the card 39, it is possible to find out that, for example, the owner of the card 39 has not touched the cash.

Fourth Embodiment

With the third embodiment of the invention, the mirror 118 with the surface doglegged in the middle is formed by bonding the right mirror 118a and the left mirror 118b to the tip of the mirror block 170, and in this case, a locating jig is required for positioning the right mirror 118a and the left mirror 118b prior to bonding work, thereby rendering fabrication work onerous. Furthermore, there is a possibility of an adhesive sticking to the surface of the right mirror 118a and the left mirror 118b. Accordingly, a fourth embodiment of the invention developed to overcome these problems, provided with a mirror with a surface doglegged in the middle, having two reflective surfaces formed in a unit, is described hereinafter.

Figure 16:
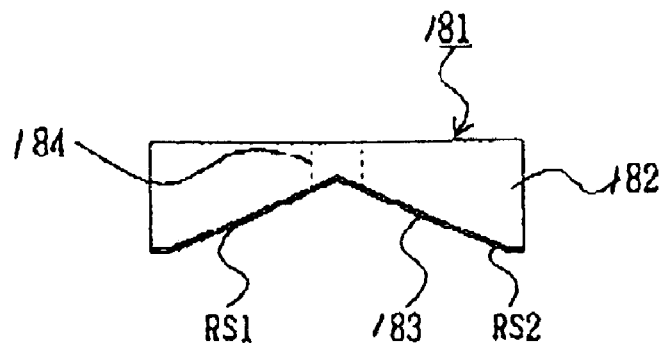
FIG. 16 is a plan view of a mirror with a surface doglegged in the middle, according to a fourth embodiment of the invention.
Figure 17:
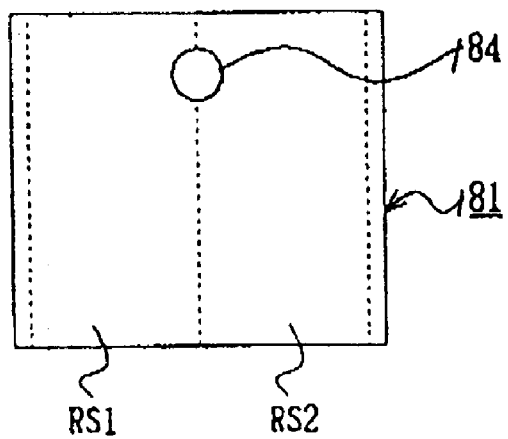
FIG. 17 is a front view of the mirror with the surface doglegged in the middle according to the fourth embodiment of the invention.
Figure 18:
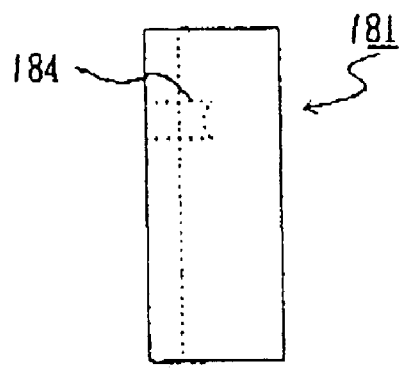
FIG. 18 is a left-hand side view of the mirror with the surface doglegged in the middle according to the fourth embodiment of the invention.

FIG. 16 is a plan view of the mirror with the surface doglegged in the middle, according to the fourth embodiment, FIG. 17 is a front view of the mirror with the surface doglegged in the middle according to the fourth embodiment, and FIG. 18 is a left-hand side view of the mirror with the surface doglegged in the middle according to the fourth embodiment.

In the figures, reference numeral 181 denotes a mirror of a V-shaped groove type with a surface doglegged in the middle, and the mirror 181 with the surface doglegged in the middle comprises a main body 182 made of glass, provided with a V-shaped groove formed on the front surface thereof by cutting work, and an aluminum coating 183 with a protective film, coated on the surface of the main body 182. The aluminum coating 183 with the protective film is formed by coating the surface of the main body 182 in a mirror-like finish with aluminum, and further by coating the surface with the protective film. The mirror 181 with the surface doglegged in the middle is fixedly attached to the mirror block 170 (refer to FIG. 6) by inserting a screw (not shown) in a hole 184 and tightening the screw up.

In this case, since the two reflective surfaces, RS1, RS2 of the mirror 181 with the surface doglegged in the middle are formed in a unit, an exact angle can be formed between the reflective surfaces, RS1 and RS2. Further, since there is no need of positioning RS1 and RS2, a work for fabricating the mirror 181 with the surface doglegged in the middle can be simplified. In addition, use of an adhesive for bonding the mirror 181 with the surface doglegged in the middle to the mirror block 170 is not required, and this eliminates a possibility of the adhesive sticking to the reflective surfaces, RS1 and RS2.

Fifth Embodiment

With the third embodiment of the invention, wherein the monitor images are divided into the regions a1 (refer to FIG. 15), b1, and b2, it becomes difficult to identify the boundaries between the respective regions a1, b1, and b2 due to the effects of color, brightness, pattern, and so forth of the monitor images.

Accordingly, a fifth embodiment of the invention, wherein the boundaries between respective regions a1, b1, and b2 can be identified with ease, is described hereinafter. Parts thereof, having the same construction as those of the third embodiment, are denoted by like reference numerals, and description thereof is omitted.

Figure 19:
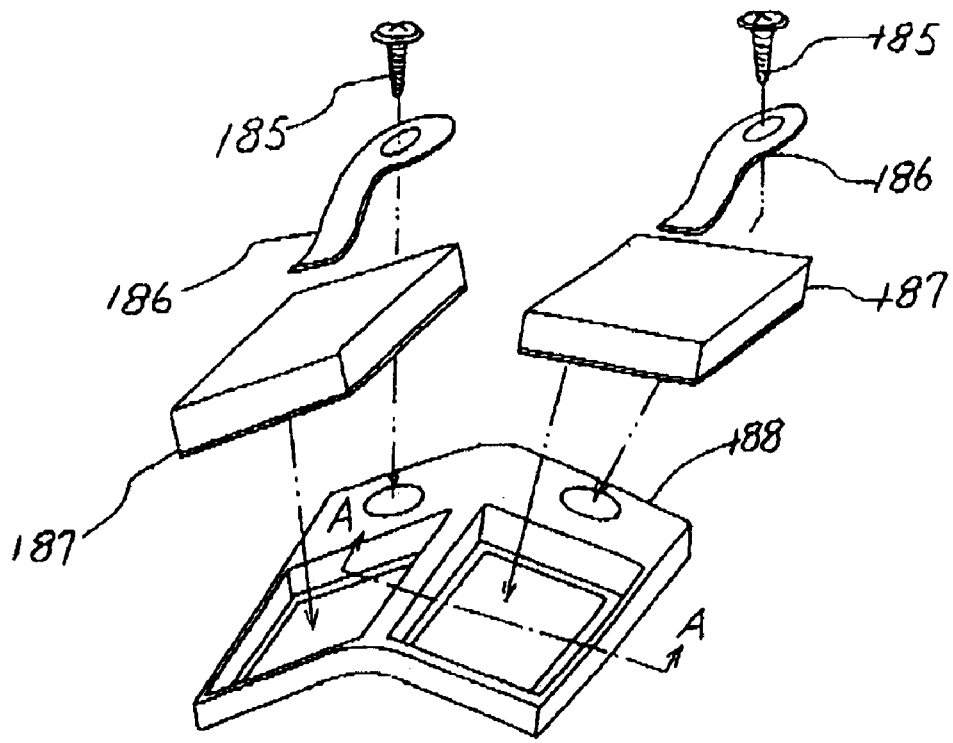
FIG. 19 is an assembly view of a mirror with a surface doglegged in the middle according to a fifth embodiment of the invention.
Figure 20:
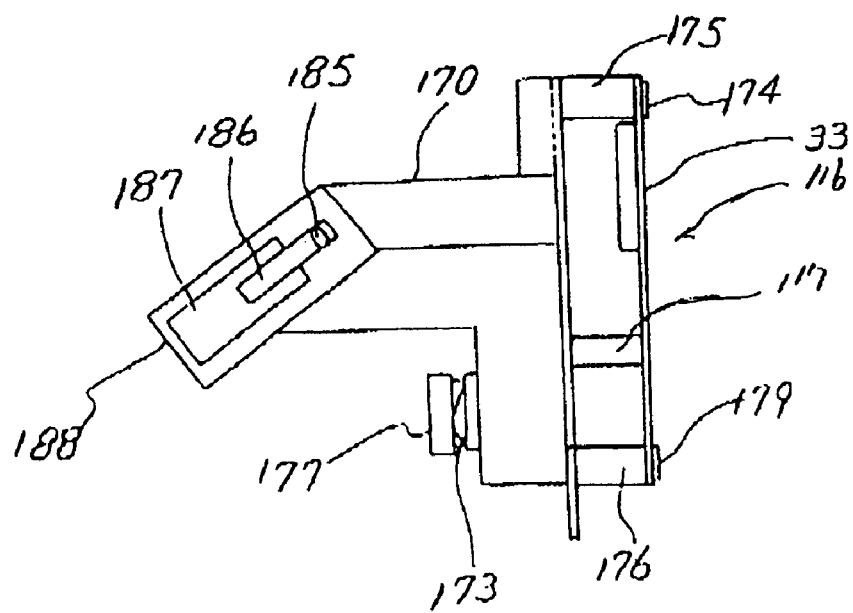
FIG. 20 is a side view of the principal part of a photographing apparatus according to the fifth embodiment of the invention.
Figure 21:
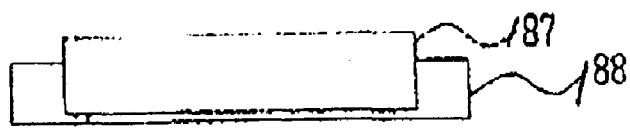
FIG. 21 is a sectional view taken on line A—A in FIG. 19.
Figure 22:
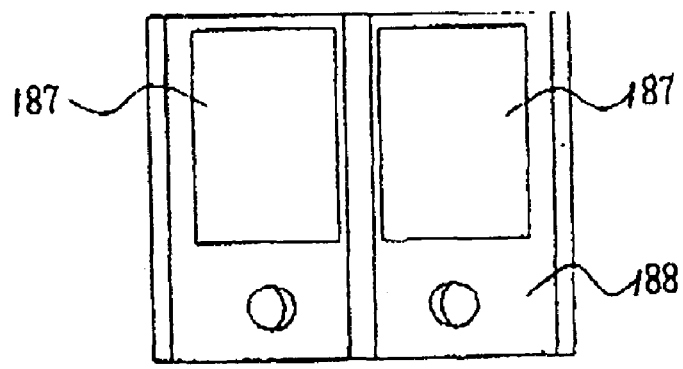
FIG. 22 is a front view of the mirror with the surface doglegged in the middle according to the fifth embodiment of the invention.
Figure 23:
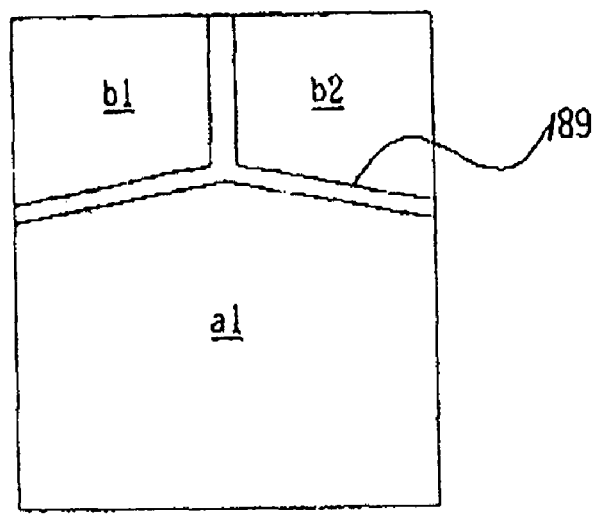
FIG. 23 is a view showing regions of a monitor image according to the fifth embodiment of the invention.

FIG. 19 is an assembly view of a mirror with a surface doglegged in the middle according to the fifth embodiment of the invention, FIG. 20 a side view of the principal part of a photographing apparatus according to the fifth embodiment of the invention, FIG. 21 a sectional view taken on line A—A in FIG. 19, FIG. 22 a front view of the mirror with a surface doglegged in the middle according to the fifth embodiment of the invention, and FIG. 23 a view showing regions of a monitor image according to the fifth embodiment of the invention.

In the figures, reference numeral 185 denotes fixture screws, 186 mirror push springs, 187 planar mirrors in rectangular shape, each provided with a reflective surface, and 188 a mirror holder with a V-shaped groove formed in the front thereof.

The respective planar mirrors 187 are fitted into recesses formed in the back face of the mirror holder 188, and are fixedly attached to the mirror holder 188 by the fixture screws 185 while pressing the back face of the respective planar mirrors 187 with the mirror push springs 186. As a result, respective edge faces of the respective planar mirrors 187 are surrounded by the mirror holder 188 to thereby form a frame in effect on the boundary of the reflective surface of the respective planar mirrors 187. In consequence, as shown in FIG. 23, the respective regions a1, b1, and b2 of a monitor image can be partitioned off by a frame 189. Accordingly, the boundaries of the respective regions a1, b1, and b2 can be identified with ease.

Also, as there is no need of using an additive for fixedly attaching the mirror holder 188 to a mirror block 170, a possibility of the additive sticking to the reflective surfaces will be eliminated.

In the case where a CCD 32 (refer to FIG. 10) used as a image forming element is of a monochromatic type, the boundaries of the respective regions a1, b1, and b2 can be identified with greater ease by using the mirror holder 188 in a whitish color. In the case where the CCD 32 is of a color type, the boundaries of the respective regions a1, b1, and b2 can be identified with greater ease if a color of a background displayed in the region a1, a color of a coin slot 120 displayed in the region b1, a color of a banknote slot 20 displayed in the region b2 are taken in account, and a relatively bright color, differing from the respective colors described, is adopted for the mirror holder 188.

Sixth Embodiment

Now, a sixth embodiment of the invention, capable of applying characteristics processing to image data, is described hereinafter. Parts thereof, having the same construction as those of the third embodiment, are denoted by like reference numerals, and description thereof is omitted.

With this embodiment, respective operations are to be executed by a CPU 51, however, the same may be executed by an operator instead.

Figure 24:
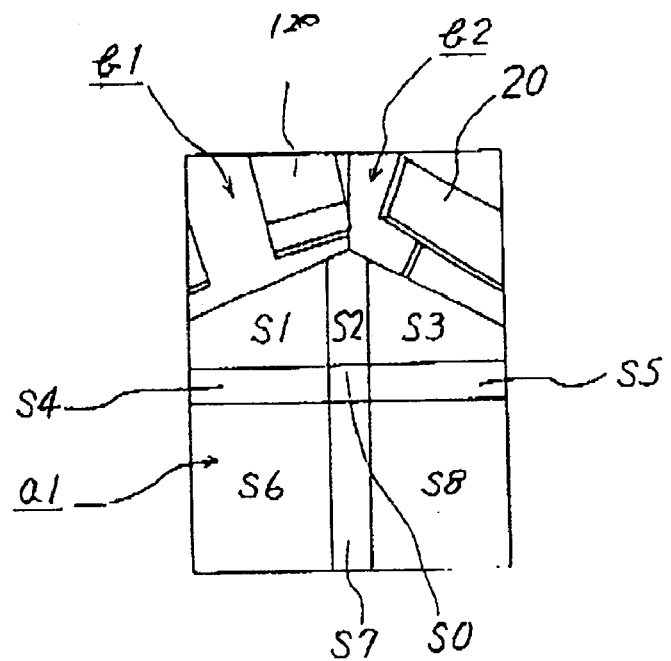
FIG. 24 is a schematic illustration showing regions for characteristics processing according to a sixth embodiment of the invention.
Figure 25:
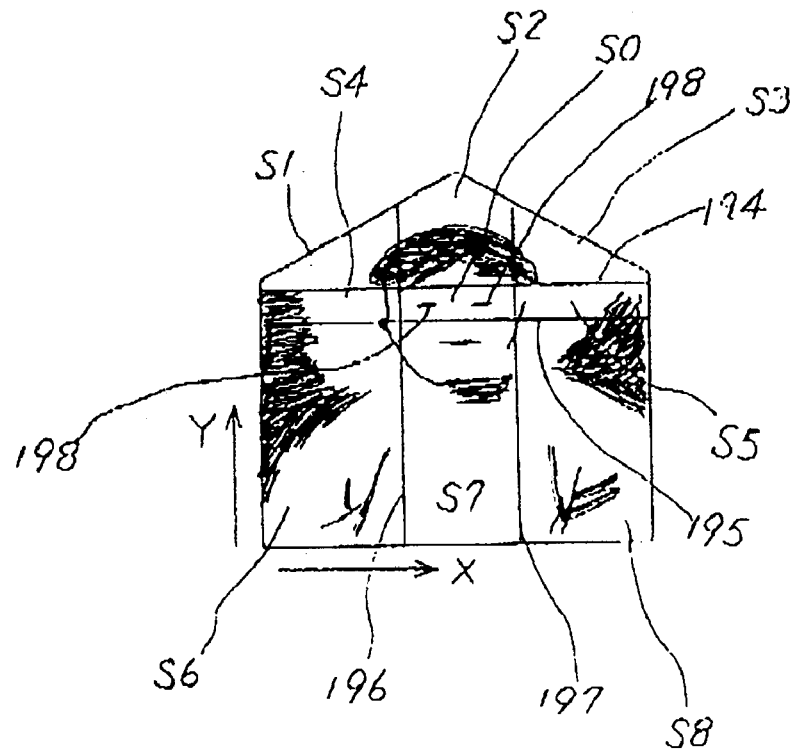
FIG. 25 is a view showing an image in black and white, according to the sixth embodiment of the invention.
Figure 26:
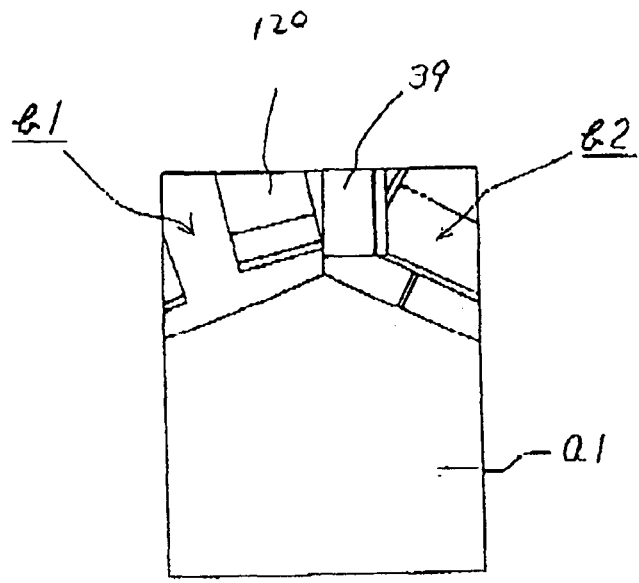
FIG. 26 is a view showing a first example of a monitor image according to the sixth embodiment of the invention.
Figure 27:
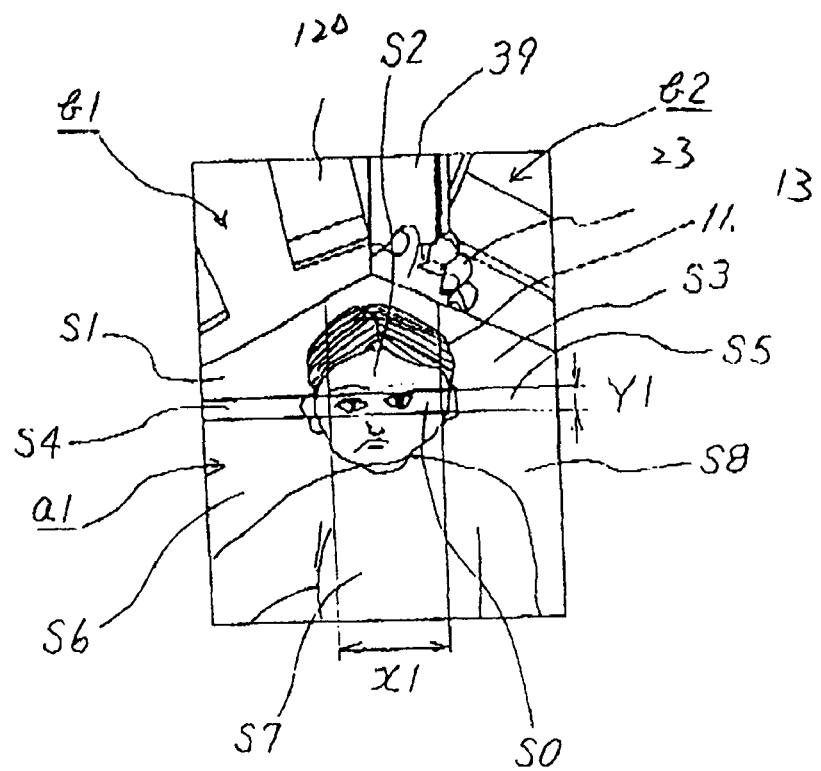
FIG. 27 is a view showing a second example of a monitor image according to the sixth embodiment of the invention.
Figure 28:
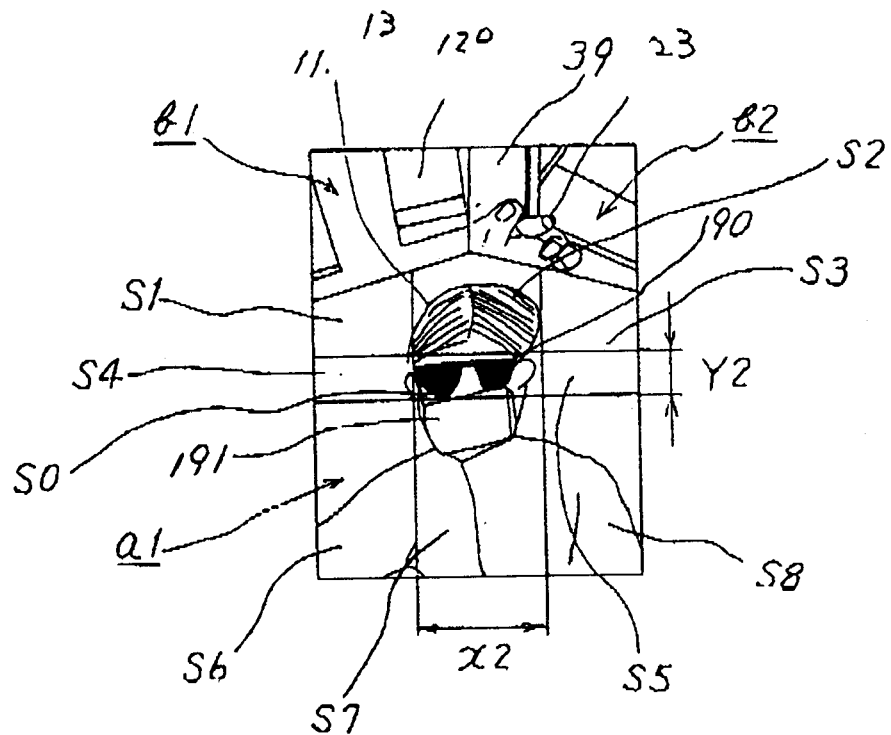
FIG. 28 is a view showing a third example of a monitor image according to the sixth embodiment of the invention.
Figure 29:
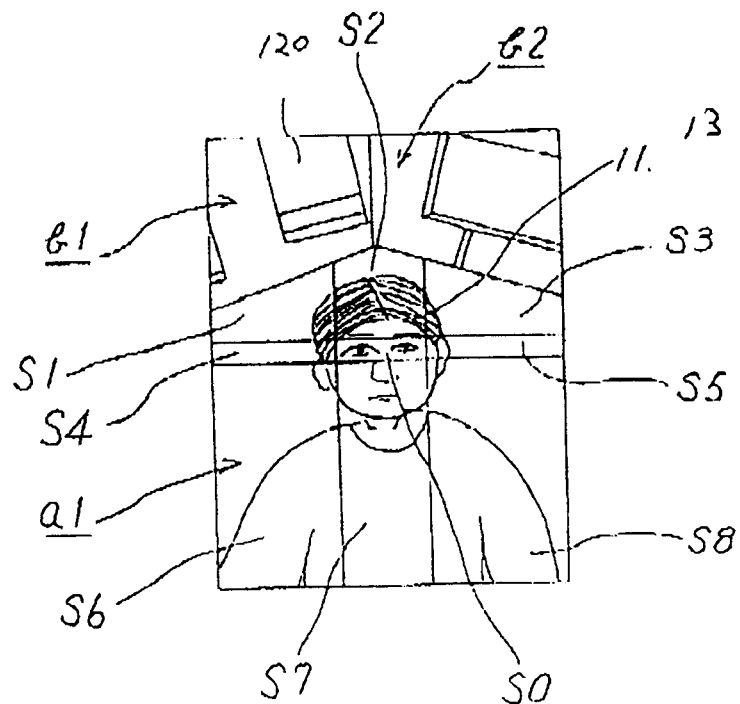
FIG. 29 is a view showing a fourth example of a monitor image according to the sixth embodiment of the invention.
Figure 30:
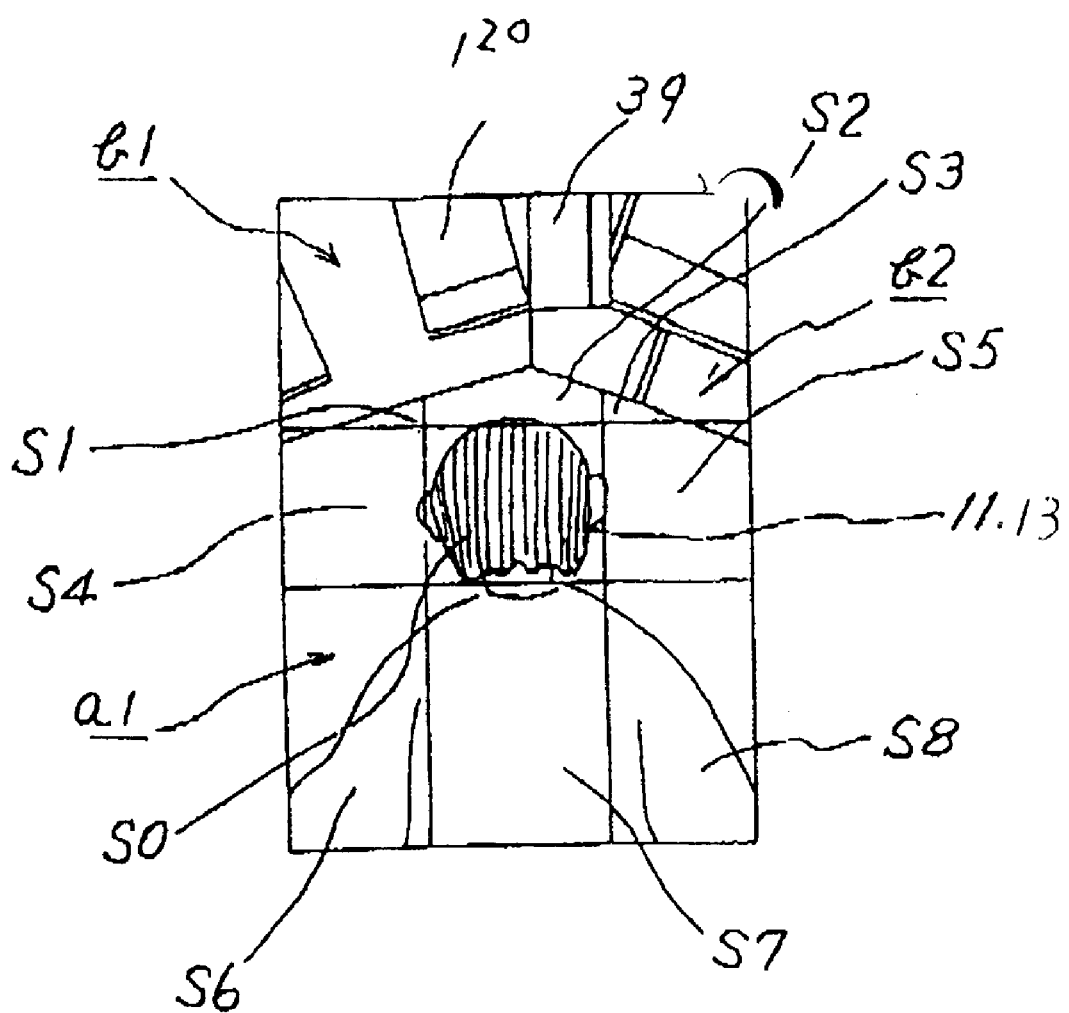
FIG. 30 is a view showing a fifth example of a monitor image according to the sixth embodiment of the invention.

FIG. 24 is a schematic illustration showing regions for characteristics processing according to the sixth embodiment of the invention, FIG. 25 is a view showing an image in black and white, according to the sixth embodiment of the invention, FIG. 26 is a view showing a first example of a monitor image according to the sixth embodiment of the invention, FIG. 27 is a view showing a second example of a monitor image according to the sixth embodiment of the invention, FIG. 28 is a view showing a third example of a monitor image according to the sixth embodiment of the invention, FIG. 29 is a view showing a fourth example of a monitor image according to the sixth embodiment of the invention, and FIG. 30 is a view showing a fifth example of a monitor image according to the sixth embodiment of the invention.

In this case, as shown in FIG. 24, the region a1 is divided into nine characteristics processing regions, S0 to S8, and characteristics processing is applied on the basis of contrast distribution of respective images in the respective characteristics processing regions, S0 to S8. To this end, characteristics processing means (not shown) in the CPU 51 (refer to FIG. 10) applies binarization processing to image data, thereby forming an image in black and white as shown in FIG. 25. Subsequently, black and white distribution is picked up in the directions X and Y in FIG. 25, a pair of black points 198 are extracted, boundary lines 194 to 197 are delineated so as to surround the black points 198, and the characteristics processing region S0 is set up around the black points 198 while the characteristics processing regions S1 to S8 are set up around the characteristics processing region S0.

Subsequently, characteristics extraction means of the characteristics processing means executes extraction of characteristics of the respective characteristics processing regions S0 to S8 in the order of the characteristics processing region S0 to the characteristics processing region S8. For example, spacing between the eyes, whether or not sunglasses 190 are worn, and so forth are extracted as the characteristics of an image in the characteristics processing region S0, a hair style (parting of hair, mesh of hair, and so forth), whether or not a hat is worn, and so forth are extracted as the characteristics of an image in the characteristics processing regions S1 to S3, a length of hair, shape of ears, whether or not earrings are worn, and so forth are extracted as the characteristics of an image in the characteristics processing regions S4 and S5, an action of arms, a dress (with half-length sleeves or long sleeves), and so forth are extracted as the characteristics of an image in the characteristics processing regions S6 and S8, and the shape of a mouth, whether or not a mask 191 is worn, whether or not a necktie (not shown) is worn, and so forth are extracted as the characteristics of an image in the characteristics processing region S7.

Thus, the CPU 51 analyzes the characteristics described above by analytical means (not shown), and makes a presumption on a condition in front of the automated-teller machine 115 (refer to FIG. 7) based on the results of an analysis by use of presumption means (not shown) or suspends transaction processing by the automated-teller machine 115 by use of transaction processing suspension means (not shown), thereafter guiding the users 11 to 13 to a teller's window of a financial institution. It is also possible to give an announcement or to display graphics in a way to correspond with actions of the users 11 to 13. With this invention, because of needs of finding out abnormal actions taken when the automated-teller machine 115 is in use, priority is given to analysis of the characteristics extracted particularly in the characteristics processing regions S0, S2, and S7.

At a time when the card 39 is detected by the card detection sensor 41, and transaction processing by the automated-teller machine 115 is started, if the face 14 of the users 11 to 13 is not displayed in the region a1 of the monitor image, and only the background of the automated-teller machine 115 is displayed therein while the card 39 is displayed in the region b2, it is presumed that a user trying to avoid monitoring by the photographing apparatus 116, or a user of an extremely short height has inserted the card 39 to operate the automated-teller machine 115.

Further, at a time immediately before the card 39 is ejected from the card slot 19, if the face 14 is not displayed in the region a1 of the monitor image, and only the background of the automated-teller machine 115 is displayed therein, it is presumed that the users 11 to 13 has forgotten to remove the card 39 and has left from the front of the automated-teller machine 115. In this case, it is possible to prevent the card 39 from being taken away by someone else if transaction processing by the automated-teller machine 115 is suspended and ejection of the card 39 from the card slot 19 is stopped.

Further, it is possible to make a presumption on a condition in front of the automated-teller machine 115 on the basis of a size of the characteristics processing region S0, and to suspend transaction processing by the automated-teller machine 115 as necessary, or to guide the users 11 to 13 using the automated-teller machine 115 to a teller's window of the financial institution. Assuming that a height of the characteristics processing region S0 of a monitor image as shown in FIG. 27 is Y1, and a width thereof is X1 while a height of the characteristics processing region S0 of a monitor image as shown in FIG. 28 is Y2, and a width thereof is X2, if Y1<Y2 and X1<X2, it can be decided that the users 11 to 13, respectively, displayed in the monitor image in FIG. 27 is a person different from the users 11 to 13, respectively, displayed in the monitor image in FIG. 28.

Further, by analyzing the characteristics of the monitor image in the characteristics processing regions S0, S2, and S7, the users 11 to 13, respectively, displayed in the monitor image in FIG. 28 is found to wear the sunglasses 190 and the mask 191.

Accordingly, upon finding that the users 11 to 13, respectively, displayed in the monitor image in FIG. 28 is using the automated-teller machine 115, it is possible to suspend transaction processing by the automated-teller machine 115, and stop ejection of the card 39, or to stop ejection of the bank note 44, the bankbook 79, the coins 144, and so forth after ejection of the card 39 even though the users 11 to 13, respectively, is the owner of the card 39.

Furthermore, as shown in FIG. 29, in case the face 14 of the users 11 to 13, respectively, is displayed in the region a1 of the monitor image, the bankbook 79 is not displayed in the region b1, and the card 39 is not displayed in the region b2, it can be decided from the expression on the face 14 of the users 11 to 13, their actions, or so forth whether or not the users 11 to 13, respectively, is waiting for completion of transaction processing by the automated-teller machine 115, or whether or not the users 11 to 13, respectively, is at a loss how to handle the automated-teller machine 115. Accordingly, the users 11 to 13 can be effectively guided.

Further, as shown in FIG. 30, in case the users 11 to 13, respectively, is present in front of the automated-teller machine 115 when the card 39 is ejected, but with their back facing the automated-teller machine 115, it is presumed that the users 11 to 13, respectively, has forgotten recovering the card 39, and is about to leave from the front of the automated-teller machine 115. In such a case, by causing the automated-teller machine 115 to sound an alarm, it is possible to turn an attention of the users 11 to 13 to the card slot 19, thereby preventing occurrence of misplacement of the card 39.

Now, operation of the photographing apparatus 116 made up as described in the foregoing is described hereinafter.

Figure 31:
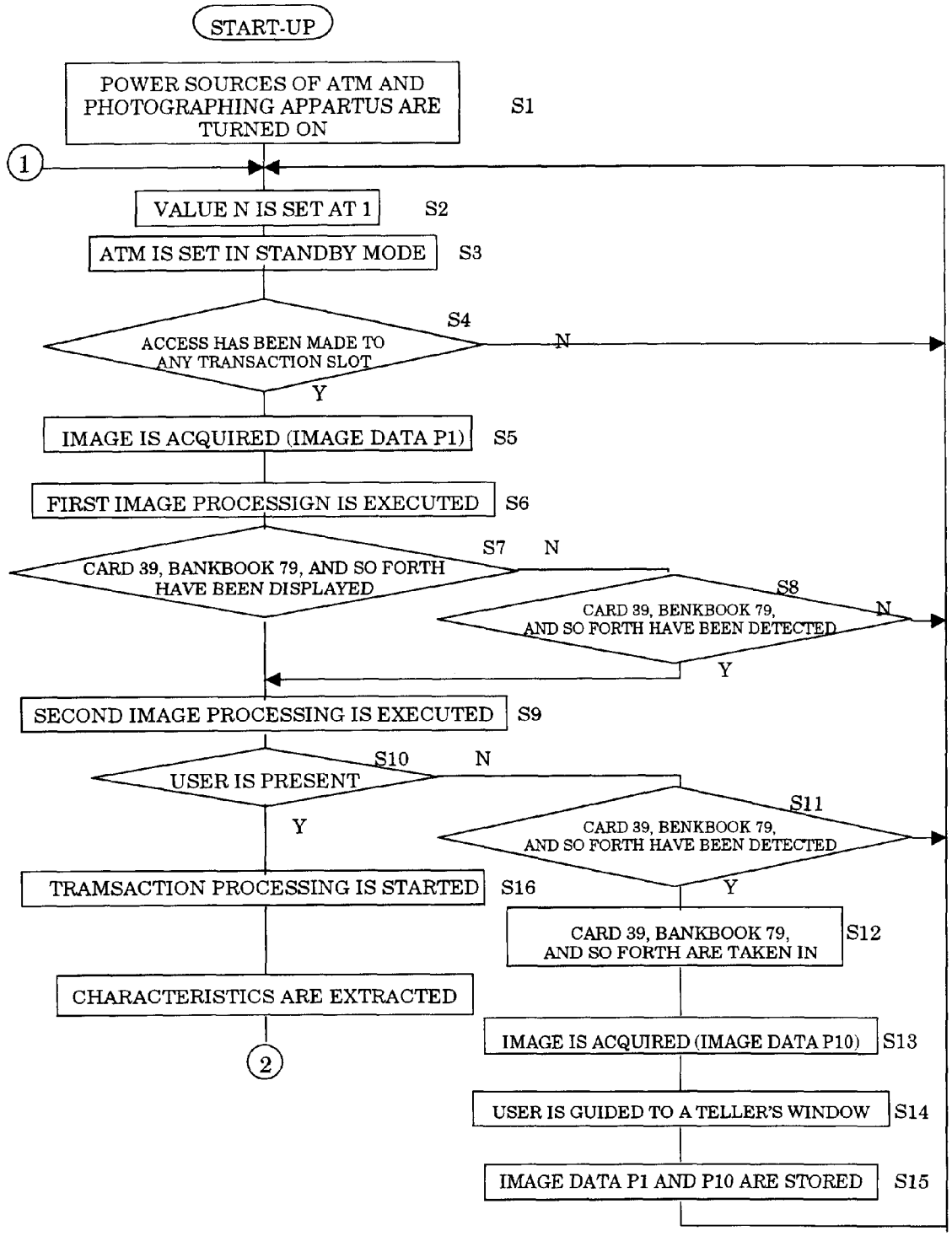
FIG. 31 is a first flow chart showing the operation of the sixth embodiment of the photographing apparatus according to the invention.
Figure 32:
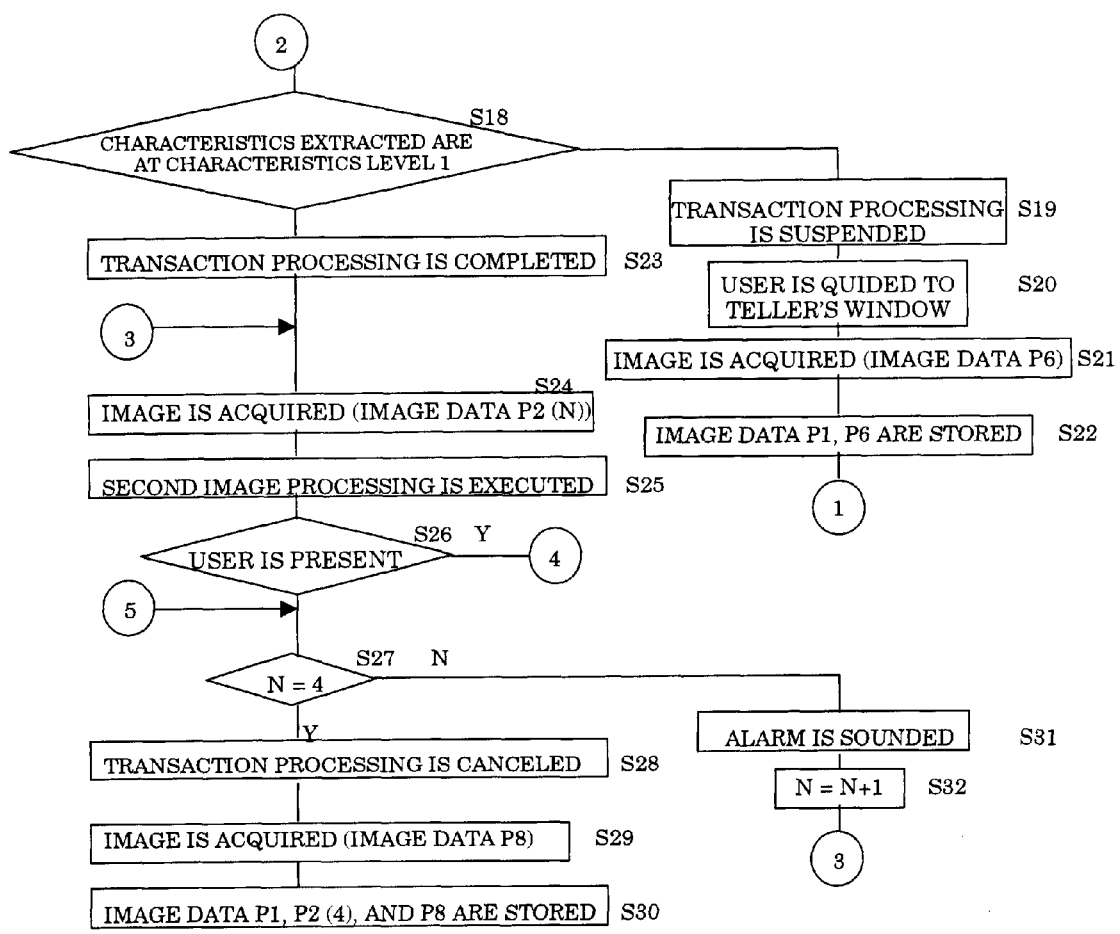
FIG. 32 is a second flow chart showing the operation of the sixth embodiment of the photographing apparatus according to the invention.
Figure 33:
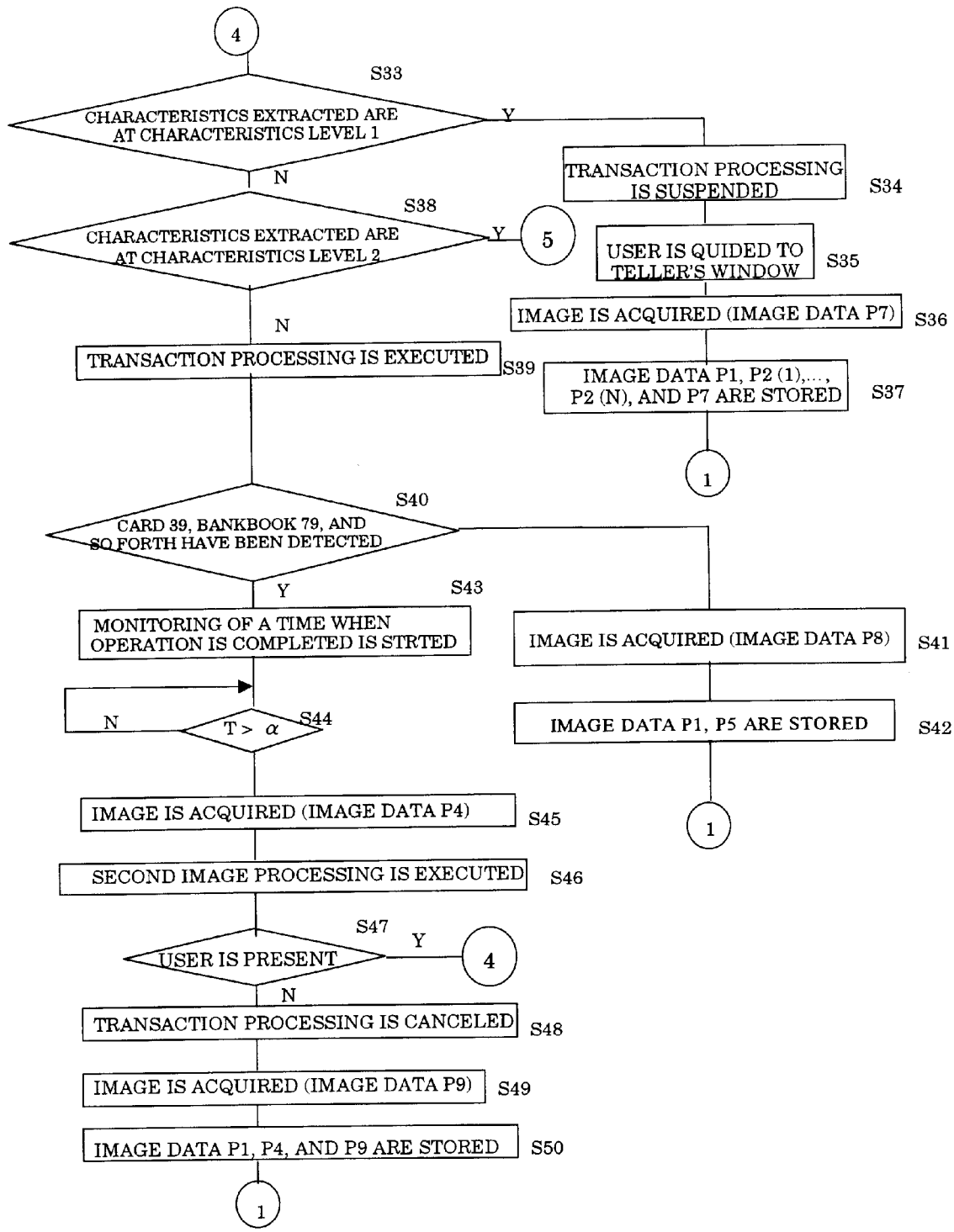
FIG. 33 is a third flow chart showing the operation of the sixth embodiment of the photographing apparatus according to the invention.

FIG. 31 is a first flow chart showing the operation of the sixth embodiment of the photographing apparatus according to the invention, FIG. 32 a second flow chart showing the operation of the sixth embodiment of the photographing apparatus according to the invention, and FIG. 33 a third flow chart showing the operation of the sixth embodiment of the photographing apparatus according to the invention.

In this case, a characteristics level 1 refers to a state wherein characteristics evidencing that the users 11 to 13 displayed in the monitor image wear the sunglasses 190, the mask 191, and so forth as shown in FIG. 28 are extracted, and a characteristics level 2 refers to a state wherein characteristics evidencing that the users 11 to 13 displayed in the monitor image turn the face 14 in the direction unsuitable for transaction processing as shown in FIG. 30 are extracted.

With this embodiment of the invention, the alarm is set to sound three times at the maximum, so that the face 14 of the users 11 to 13 is caused to turn to the transaction slots such as the card slot 19 (refer to FIG. 10), the bankbook slot 119, the bank note slot 20, the coin slot 120, and so forth.

First, power sources of the automated-teller machine (ATM) 115, and the photographing apparatus 116 are turned on, setting the automated-teller machine 115 in standby mode. The CPU 51 makes decision on the basis of the detection signals from the card detection sensor 41, the hand detection sensors 46, 146, and the bankbook detection sensor 141 on whether or not there has been an access to the transaction slots described above made by the users 11 to 13, and at the same time, checks to which of the transaction slots the access has been made.

Subsequently, by photographing the face 14 and the hand 23 of the users 11 to 13 with a camera 117 with lenses, images are acquired, thereby generating image data P1. The CPU 51 executes a first image processing based on the image data P1 in the regions, b1 and b2, and decides whether or not the card 39, the bankbook 79, and so forth have been displayed in the regions, b1 and b2 on the basis of results of the image processing. Further, in case the card 39, the bankbook 79, and so forth have been displayed, the CPU 51 decides whether or not the card 39, the bankbook 79, and so forth have been detected by the card detection sensor 41, the bankbook detection sensor 141, and so forth.

Further, in case the card 39, the bankbook 79, and so forth have been detected, it is deemed that the users 11 to 13, respectively, takes any action in front of the automated-teller machine 115. Accordingly, the CPU 51 executes a second image processing based on the image data P1 in the region a1, and decides whether or not the users 11 to 13, respectively, are present in front of the automated-teller machine 115 on the basis of results of the image processing. In this case, the CPU 51 applies binarization processing to the image data P1, and decides whether or not the image in black and white as shown in FIG. 25 can be produced. In case the image in black and white can not be produced, the CPU 51 decides that the users 11 to 13, respectively, are not present in front of the automated-teller machine 115.

The CPU 51, upon deciding that the users 11 to 13, respectively, are not present in front of the automated-teller machine 115, decides again whether or not the card 39, the bankbook 79, and so forth have been detected by the card detection sensor 41, the bankbook detection sensor 141, and so forth. In case the card 39, the bankbook 79, and so forth have been detected, it is presumed that the users 11 to 13, respectively, trying to avoid surveillance by the photographing apparatus 116, or the users 11 to 13, respectively, of an extremely short height have inserted the card 39 and are using the automated-teller machine 115. Thereupon, the CPU 51 decides that it is impossible to carry on transaction processing by the automated-teller machine 115, and takes in the card 39, the bankbook 79, and so forth while causing the photographing apparatus 116 to photograph the face 14, the hand 23, and so forth with the camera 117 with the lenses, thereby acquiring an image, and generating image data P10.

Subsequently, the CPU 51 displays guidance on a display of a CRT 21 provided with touch panels, and guides the users 11 to 13, respectively, to a teller's window of the financial institution. Then, a clerk of the financial institution has an interview with the users 11 to 13, respectively, in person to check their identity. Further, the CPU 51 adds a code F to the image data P1, P10, and causes storage means (not shown) to store the image data P1, P10 together with the code F in the memory 52 as recording means. Accordingly, the actions of the users 11 to 13, respectively, when it has been decided that it is impossible to carry on transaction processing by the automated-teller machine 115, can be recorded.

In case it has been decided based on the results of the second image processing that the users 11 to 13, respectively, are present in front of the automated-teller machine 115, the CPU 51 starts transaction processing. While executing the transaction processing, the CPU 51 extracts characteristics in the characteristics processing regions, S0 to S8 on the basis of the image data P1, and decides whether or not the characteristics extracted are at the characteristics level 1. In case the characteristics extracted are found at the characteristics level 1, the CPU 51 suspends the transaction processing, and takes in the card 39, the bankbook 79, and so forth while displaying guidance on the display of the CRT 21 provided with the touch panels to guide the users 11 to 13, respectively, to a teller's window of the financial institution. Then, a clerk of the financial institution has an interview with the users 11 to 13, respectively, in person to check their identity. Subsequently, the CPU 51 causes the photographing apparatus 116 to photograph the face 14, the hand 23, and so forth of the users 11 to 13 with the camera 117 with the lenses, thereby acquiring an image, and generating image data P6. Thereafter, the storage means adds a code A to the image data P1, P6 and stores the image data P1, P6 together with the code A in the memory 52. Thus, returning the card 39, the bankbook 79, and so forth to a suspicious-looking person, or delivering the bank note 44, the coins 144, and so forth to the suspicious-looking person can be prevented. Further, in case the suspicious-looking person has left the scene without proceeding to a teller's window of the financial institution, the actions of the person can be recorded.

In case the characteristics extracted are not found at the characteristics level 1, the CPU 51 completes the transaction processing, and at the same time, returns the card 39, the bankbook 79, and so forth to the users 11 to 13, respectively. If the transaction processing is payment processing, a given amount of cash is delivered to the bank note slot 20 and the coin slot 120. At this point in time, the CPU 51 causes the photographing apparatus 116 to photograph the face 14, the hand 23, and so forth of the users 11 to 13 with the camera 117 with the lenses, thereby acquiring an image, and generating image data P2 (N). Accordingly, in case cash has been withdrawn by threatening the owner of the card 39, it is possible to find out that, for example, the owner of the card 39 has not touched the cash.

Accordingly, the CPU 51 executes a second image processing based on the image data P2 (N) in the region a1, and decides whether or not the users 11 to 13, respectively, are present in front of the automated-teller machine 115 on the basis of results of the image processing. In case the users 11 to 13, respectively, are not present in front of the automated-teller machine 115, the CPU 51 sounds an alarm three times at the maximum in order to let the users 11 to 13, respectively, know that the transaction processing has been completed. Also, it is possible to display letters "alarm" on the CRT 21 provided with the touch panels. In case the users 11 to 13, respectively, have forgotten pulling out the card 39, the bankbook 79, and so forth, or taking out the bank note 44, the coins 144, and so forth although the alarm has been sounded as above, the CPU 51 cancels the transaction processing at the stage where the alarm has been sounded three times, and takes in the card 39, the bankbook 79, the bank note 44, the coins 144, and so forth, while displaying the letters on the CRT 21 provided with the touch panels, advising that the transaction processing has been canceled. Subsequently, the CPU 51 causes the photographing apparatus 116 to photograph the face 14, the hand 23, and so forth of the users 11 to 13 with the camera 117 with the lenses, thereby acquiring an image, and generating image data P8. Thereafter, the storage means adds a code E to the image data P1, P2 (4), and P8, and stores the image data P1, P2 (4), and P8 together with the code E in the memory 52.

In case the users 11 to 13, respectively, are present in front of the automated-teller machine 115, the CPU 51 extracts characteristics in the characteristics processing regions, S0 to S8 on the basis of the image data P2 (N), and decides whether or not the characteristics extracted are at the characteristics level 1. In case the characteristics extracted are found at the characteristics level 1, the CPU 51 suspends the transaction processing, and takes in the card 39, the bankbook 79, and so forth while displaying guidance on the display of the CRT 21 provided with the touch panels to guide the users 11 to 13, respectively, to a teller's window of the financial institution. Then, a clerk of the financial institution has an interview with the users 11 to 13, respectively, in person to check their identity. Subsequently, the CPU 51 causes the photographing apparatus 116 to photograph the face 14, the hand 23, and so forth of the users 11 to 13 with the camera 117 with the lenses, thereby acquiring an image, and generating image data P1, P2 (1), P2 (2), . . . , P2 (N), P7.

Thereafter, a code B is added to the image data P1, P2 (1), P2 (2), . . . , P2 (N), and P7, and the image data P1, P2 (1), P2 (2), . . . , P2 (N), and P7 together with the code B are stored in the memory 52. by the storage means.

In case the characteristics extracted are not found at the characteristics level 1, the CPU 51 decides whether or not the characteristics extracted are at the characteristics level 2. In case the characteristics extracted are found at the characteristics level 2, the users 11 to 13, respectively, have their back facing the automated-teller machine 115 as shown in FIG. 30, and accordingly, the CPU 51 sounds an alarm three times at the maximum in order to let the users 11 to 13, respectively, know that the transaction processing has been completed.

In case the users 11 to 13, respectively, have forgotten pulling out the card 39, the bankbook 79, and so forth, or taking out the bank note 44, the coins 144, and so forth although the alarm has been sounded as above, the CPU 51 cancels the transaction processing at the stage where the alarm has been sounded three times, and takes in the card 39, the bankbook 79, the bank note 44, the coins 144, and so forth, while displaying the letters on the CRT 21 provided with the touch panels, advising that the transaction processing has been canceled. Subsequently, the CPU 51 causes the photographing apparatus 116 to photograph the face 14, the hand 23, and so forth of the users 11 to 13, respectively, with the camera 117 with the lenses, thereby acquiring an image, and generating image data P8. Thereafter, a code E is added to the image data P1, P2 (4), and P8, and the image data P1, P2 (4), and P8 together with the code E are stored in the memory 52. by the storage means.

Further, in case the characteristics extracted are not found at the characteristics level 2, the CPU 51 executes the transaction processing, and returns the card 39, the bankbook 79, and so forth to the users 11 to 13, respectively. If the transaction processing is payment processing, a given amount of cash is delivered to the bank note slot 20 and the coin slot 120.

Now, the image data P2 (N) is normally generated by an image of the owner of the card 39, the bankbook 79, and so forth, in a state of looking at a predetermined transaction slot. Accordingly, when the image data P2 (N) is being generated, the users 11 to 13, respectively, are present in front of the automated-teller machine 115, and at the same time, the characteristics extracted are neither at the characteristics level 1 nor at the characteristics level 2. The CPU 51 therefore executes the transaction processing, returning the card 39, the bankbook 79, and so forth to the users 11 to 13, respectively, and if the transaction processing is payment processing, a given amount of cash is delivered to the bank note slot 20 and the coin slot 120. Accordingly, the card 39, the bankbook 79, and so forth are detected by the card detection sensor 41, the bankbook detection sensor 141, and so forth.

So, when the card 39, the bankbook 79, and so forth are no longer detected by the card detection sensor 41, the bankbook detection sensor 141, and so forth, the CPU 51 decides that the card 39, the bankbook 79, and so forth have been pulled out. Subsequently, the CPU 51 causes the photographing apparatus 116 to photograph the face 14, the hand 23, and so forth of the users 11 to 13, respectively, with the camera 117 with the lenses, thereby acquiring an image, and generating image data P5. Thereafter, a code D is added to the image data P1, and P5, and the image data P1, and P5 together with the code D are stored in the memory 52 by the storage means.

Further, in case the card 39, the bankbook 79, and so forth are detected, the CPU 51 starts monitoring a time when the operation is completed, and starts counting time with a built-in timer (not shown). Upon time T exceeding a threshold value α, the CPU 51 causes the photographing apparatus 116 to photograph the face 14, the hand 23, and so forth of the users 11 to 13, respectively, with the camera 117 with the lenses, thereby acquiring an image, and generating image data P4. Subsequently, the CPU 51 executes a second image processing based on the image data P4 of the region a1, and decides whether or not the users 11 to 13, respectively, are present in front of the automated-teller machine 115 on the basis of results of the image processing. In case the users 11 to 13, respectively, are not present in front of the automated-teller machine 115, the CPU 51 cancels the transaction processing, and takes in the card 39, the bankbook 79, the bank note 44, the coins 144, and so forth. Subsequently, the CPU 51 causes the photographing apparatus 116 to photograph the face 14, the hand 23, and so forth of the users 11 to 13 with the camera 117 with the lenses, thereby acquiring an image, and generating image data P9. Thereafter, a code C is added to the image data P1, P4, and P9, and the image data P1, P4, and P9 together with the code C are stored in the memory 52 by the storage means. With this embodiment of the invention, the threshold value α is set at about 30 seconds.

The codes A to F described above represent photographed conditions for the respective image data stored in the memory 52, that is, the actions of the users 11 to 13, respectively, following which the automated-teller machine 115 has been used. Accordingly, the respective image data can be retrieved based on the codes A to F.

Further, it is possible to count the number of times the automated-teller machine 115 has been used on the basis of the number of the image data with the code B added thereto. Also, similar analysis can be made on the basis of the number of the image data with another code added thereto. Further, it is also possible to carry out similar analysis on the basis of the amount of image data with an identical code added thereto. Also, it is possible to add predetermined additional information to the forefront part or the rearmost part of image data when storing the image data in the memory 52. With this embodiment of the invention, sensor numbers, photographing time, transaction customer numbers, transaction operation items, and the like are added as the additional information.

Now, a flow chart of the operation of the photographing apparatus 116 is described hereinafter.

step S1: Turn on the power sources of the automated-teller machine (ATM) 115, and the photographing apparatus 116.
step S2: Set a value N at 1.
step S3: Set the automated-teller machine 115 in standby mode.
step S4: A decision is made on whether or not an access has been made to any transaction slot. In case an access has been made to a transaction slot, the operation proceeds to step S5. Otherwise, the operation reverts to the step S2.
step S5: An image is acquired (image data P1).
step S6: A first image processing is executed.
step S7: A decision is made on whether or not the card 39, the bankbook 79, and so forth have been displayed. In case the card 39, the bankbook 79, and so forth have been displayed, the operation proceeds to step S9. Otherwise, the operation proceeds to step S8.
step S8: A decision is made on whether or not the card 39, the bankbook 79, and so forth have been detected. In case the card 39, the bankbook 79, and so forth have been detected, the operation proceeds to step S9. Otherwise, the operation reverts to step S2.
step S9: A second image processing is executed.
step S10: A decision is made on whether or not the users 11 to 13, respectively, are present in front of the automated-teller machine 115.
In case the users 11 to 13, respectively, are present, the operation proceeds to step S16. Otherwise, the operation proceeds to step S11.
step S11: A decision is made on whether or not the card 39, the bankbook 79, and so forth have been detected. In case the card 39, the bankbook 79, and so forth have been detected, the operation proceeds to step S12. Otherwise, the operation reverts to step S2.
step S12: The card 39, the bankbook 79, and so forth are taken in.
step S13: An image is acquired (image data P10).
step S14: The users 11 to 13, respectively, are guided to a teller's window.
step S15: The image data P1, P10 are stored, and the operation reverts to step S2.
step S16: Transaction processing is started.
step S17: Characteristics are extracted.
step S18: A decision is made on whether or not characteristics extracted are at a characteristics level 1. In case the characteristics extracted are at the characteristics level 1, the operation proceeds to step S19. Otherwise, the operation reverts to step S23.
step S19: The transaction processing is suspended.
step S20: The users 11 to 13, respectively, are guided to a teller's window.
step S21: An image is acquired (image data P6).
step S22: The image data P1, P6 are stored, and the operation reverts to step S2.
step S23: The transaction processing is completed.
step S24: An image is acquired {image data P2 (N)}.
step S25: A second image processing is executed.
step S26: A decision is made on whether or not the users 11 to 13, respectively, are present in front of the automated-teller machine 115. In case the users 11 to .13, respectively, are present, the operation proceeds to step S33. Otherwise, the operation proceeds to step S27.
step S27: A decision is made on whether or not a value N is 4. If the value N is 4, the operation proceeds to step S28. Otherwise, the operation proceeds to step S31.
step S28: The transaction processing is canceled.
step S29: An image is acquired (image data P8).
step S30: The image data P1, P2 (4), and P8 are stored, and the operation reverts to step S2.
step S31: An alarm is sounded.
step S32: The value N is varied by an increment of 1, and the operation reverts to step S24.
step S33: A decision is made on whether or not the characteristics extracted are at the characteristics level 1. In case the characteristics extracted are at the characteristics level 1, the operation proceeds to step S34. Otherwise, the operation reverts to step S38.
step S34: The transaction processing is suspended.
step S35: The users 11 to 13, respectively, are guided to a teller's window.
step S36: An image is acquired (image data P7).
step S37: The image data P1, P2 (1), . . . , P2 (N), and P7 are stored, and the operation reverts to step S2.
step S38: A decision is made on whether or not the characteristics extracted are at the characteristics level 2. In case the characteristics extracted are at the characteristics level 2, the operation reverts to step S27. Otherwise, the operation proceeds to step S39.
step S39: Transaction processing is executed. step S39: step S39: step S40: A decision is made on whether or not the card 39, the bankbook 79, and so forth have been detected. In case the card 39, the bankbook 79, and so forth have been detected, the operation proceeds to step S43. Otherwise, the operation proceeds to step S41.
step S41: An image is acquired (image data P5).
step S42: The image data P1, and P5 are stored, and the operation reverts to step S2.
step S43: Monitoring of a time when the operation is completed is started.
step S44: the operation waits until time T exceeds a threshold value α.
step S45: An image is acquired (image data P4).
step S46: A second image processing is executed.
step S47: A decision is made on whether or not the users 11 to 13, respectively, are present in front of the automated-teller machine 115. In case the users 11 to 13, respectively, are present, the operation reverts to step S33. Otherwise, the operation proceeds to step S48.
step S48: The transaction processing is canceled.
step S49: An image is acquired (image data P9).
step S50: The image data P1, P4, and P9 are stored, and the operation reverts to step S2.

Seventh Embodiment

With the above-described embodiments of the invention, the photographing apparatus is made up such that the face of the users and sites of the users, other than the face, are photographed with one unit of the camera so as to be optically combined into one image data. However, it is also possible to make up a photographing apparatus such that the face of the users and the sites of the users, other than the face, are photographed with two units of camera, respectively, and respective image data of the users photographed are combined into one image data through arithmetic processing.

Now, a seventh embodiment of a photographing apparatus according to the invention, wherein the face of the users and the sites of the users, other than the face, are photographed with two units of camera, respectively, and respective image data of the users photographed are combined into one image data through arithmetic processing, is described hereinafter. Parts thereof, having the same construction as those of the embodiments previously described, are denoted by like reference numerals, and description thereof is omitted.

Figure 34:
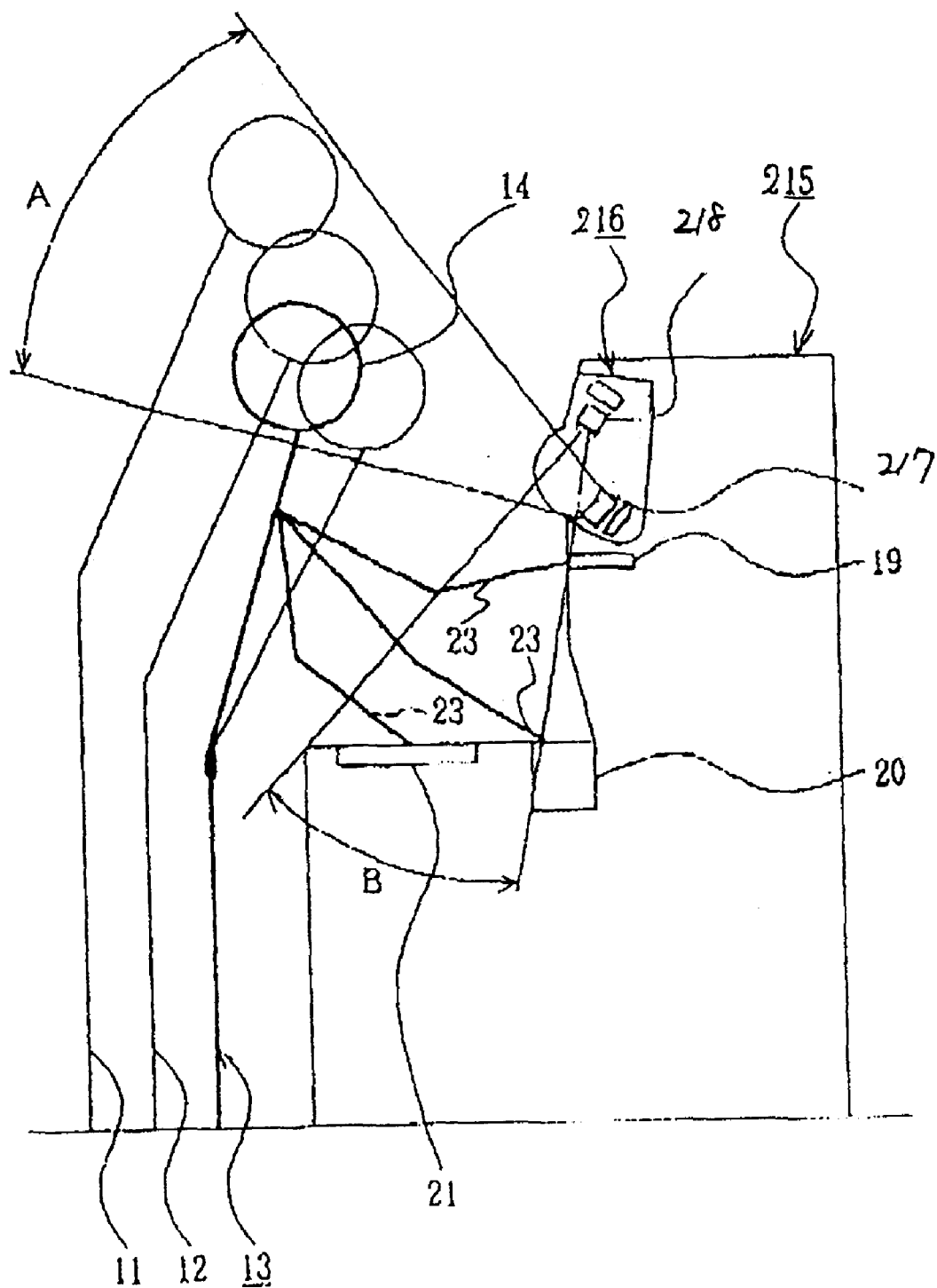
FIG. 34 is a side view of an automated-teller machine wherein a seventh embodiment of a photographing apparatus according to the invention is mounted.
Figure 35:
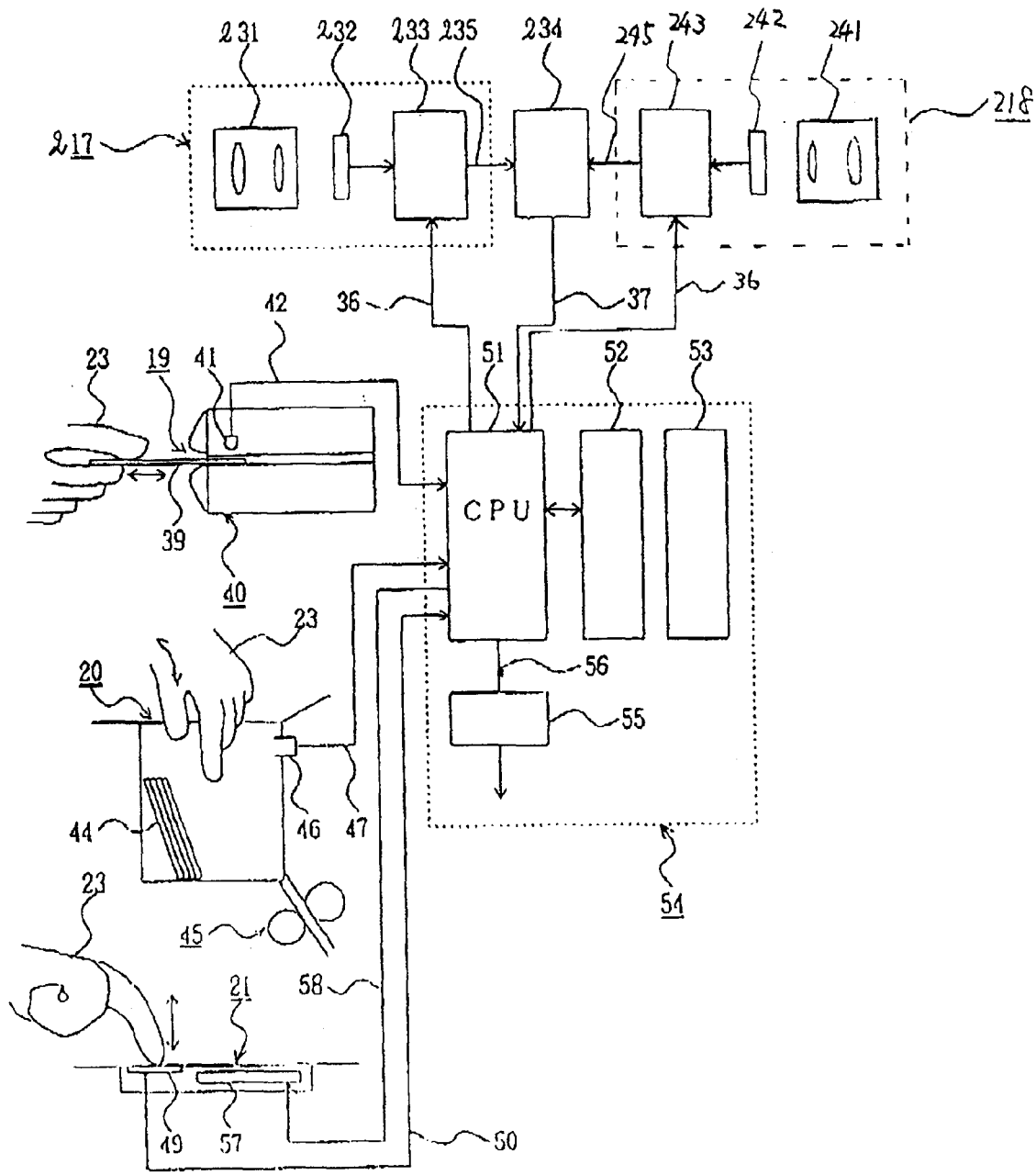
FIG. 35 is a block diagram of the seventh embodiment of the photographing apparatus according to the invention.

FIG. 34 is a side view of an automated-teller machine wherein the seventh embodiment of the photographing apparatus according to the invention is mounted, and FIG. 35 is a block diagram of the seventh embodiment of the photographing apparatus according to the invention.

In the figures, reference numeral 215 denotes an automated-teller machine, 216 a photographing apparatus, 217 a camera with lenses for photographing a face, 218 a camera with lenses for photographing a hand, 231 a lens unit as a condenser element, 232 a CCD as an image forming element, and 233 a CCD control circuit for controlling the CCD 232 while serving as an image pickup controller for generating video signals based on output of the CCD 232, 234 an image processing circuit as an image data generating means for executing image processing based on the video signals, and generating image data, 235 a video signal line for sending out the video signals from the CCD control circuit 233 to the image processing circuit 234, 241 a lens unit as a condenser element, 242 a CCD as an image forming element, and 243 a CCD control circuit for controlling the CCD 242 while serving as an image pickup controller for generating video signals based on output of the CCD 242, and 245 a video signal line for sending out the video signals from the CCD control circuit 243 to the image processing circuit 234.

With the photographing apparatus made up as described above, a CPU 51 receives detection signals such as a card detection signal, a hand detection signal, a touch-panel sensor signal, a bankbook detection signal, and so forth from a card detection sensor 41 disposed in a card processing unit 40, a hand detection sensor 46 disposed inside a bank note slot 20, a touch-panel sensor 49 disposed in a CRT 21 provided with touch panels, a bankbook detection sensor disposed in a bankbook processing unit (not shown), and so forth, respectively, whereupon the CPU 51 sends out a photographing timing signal to the CCD control circuit 233 of the camera 217 with the lenses for photographing the face and to the CCD control circuit 243 of the camera 218 with the lenses for photographing the hand via respective photographing timing signal lines 36. The CCD control circuits 233, 243, upon receiving the respective photographing timing signals, executes control of the CCDs 232, 242, respectively, according to the respective photographing timing signals. As a result, the face 14 of the users 11 to 13 is photographed by the camera 217 with the lenses for photographing the face, and the hand 23 of the users 11 to 13 is photographed by the camera 218 with the lenses for photographing the hand. Image data of the face 14 photographed are sent out from the CCD control circuits 233 of the camera 217 with the lenses for photographing the face to the image processing circuit 234. Further, image data of the hand 23 photographed are sent out from the CCD control circuits 243 of the camera 218 with the lenses for photographing the hand to the image processing circuit 234. The image processing circuit 234 applies predetermined arithmetic processing to the image data of the face and the hand as acquired, thereby forming an image as shown, for example, in FIG. 4.

Similarly to other embodiments described hereinbefore, with the seventh embodiment of the invention made up as above, the amount of image data for each case of transaction processing can be reduced, and consequently, twice as much image data as for the conventional case can be stored with the same storage capacity.

It is to be understood that the scope of the invention is not limited to the embodiments described in the foregoing, and changes and variations may be made without departing from the spirit or scope of the invention.

For example, with the invention, an operation console (touch panel) for use by an attendant, disposed in the transaction processing unit, may be used as read-out means and an image display unit, and thereby a supervisor is able to check an image of a user when a trouble occurs at a location where the transaction processing unit is installed. Further, the photographing apparatus of the invention may be made up such that biometric data such as iris, finger print, etc. are acquired from a user, and these data are stored in the memory means in such a way as to correspond with the image data obtained by photographing with the photographing apparatus. Furthermore, the photographing apparatus can be mounted in not only the automated-teller machine but also the unattended transaction terminal, shopping terminal, vending machine, POS terminal (including a cash register), and so forth. The monitoring system of the invention includes all the photographing apparatuses described above.

As described in detail hereinbefore, the photographing apparatus according to the invention comprises the image forming element having the image forming face, the photographing field angle dividing means for dividing the photographing field angle so as to correspond with the plurality of the sites to be photographed, and forming the image of the respective sites to be photographed on the image forming element, and the image data generation means for generating the image data of the respective sites to be photographed on the basis of output of the image forming element.

With the invention having such a constitution, images of the plurality of the sites to be photographed can be formed on one image forming face of the image forming element, and accordingly, the plurality of the sites to be photographed can be simultaneously photographed with one unit of photographing means. Consequently, with the invention, it becomes unnecessary to install a plurality of image pickup means in order to photograph the respective sites to be photographed, thereby enabling the photographing apparatus to be reduced in cost as well as size. Also, with the invention, the plurality of the sites to be photographed can be captured in one image frame, thereby enabling the image data to be lessened to that extent.

Further, when displaying the image data of the sites to be photographed, which are photographed at a remote location, in the form of a monitor image in order to monitor actions of a user of the transaction processing apparatus, it is unnecessary to install a plurality of monitors for displaying a monitor image for the respective sites to be photographed, and since the monitor image for the respective sites to be photographed can be displayed on one monitor screen, the image processing unit becomes unnecessary. Thus, the cost of the photographing apparatus according to the invention can be lowered.

Further, the photographing apparatus according to the invention can be made up such that the photographing field angle dividing means is provided with two reflective surfaces disposed symmetrically with respect to the optical path of the image forming element.

In this case, since the photographing field angle dividing means is provided with two reflective surfaces, the respective sites to be photographed can be simultaneously photographed. Accordingly, in case the transaction processing unit is wrongfully utilized, it is possible to photograph actions of the user in a region within reach of his or her hand, actions of the user making access to the respective transaction slots, and so forth, so that it can be verified with ease that the transaction processing unit has been wrongfully utilized.

Further, the needs of installing a plurality of cameras such as the camera used exclusively for the face 14, the camera used exclusively for the hand 23, and so forth as the image pickup means are eliminated with the result that not only the cost of the photographing apparatus can be reduced but also the size of the transaction processing unit can be reduced.

Further, with such a constitution as described above, even in the case where it is not possible to provide a large distance between the image pickup means and the user, it is possible to enlarge the photographing field angles. Accordingly, it is unnecessary to enlarge the field angles of the lenses, so that distortion of the monitor images, otherwise occurring on the rim of the screen of the monitoring unit, can be prevented. As a result, the respective sites to be photographed can be recognized with ease. In addition, since there is no need of using expensive wide-angled lenses, the cost of the photographing apparatus can be reduced.

What is claimed is:

1. A photographing apparatus comprising:
   a camera having a field of view with a photographing field angle, the camera being provided with an image forming element having an image forming face;
   photographing field angle dividing means for dividing the photographing field angle so as to correspond with a plurality of sites to be photographed, and forming an image of the respective sites to be photographed on the image forming element; and
   image data generation means for generating image data of the respective sites to be photographed on the basis of output of the image forming element,
   wherein the camera is aimed directly at a first one of the sites to be photographed, and the photographing field angle dividing means comprises a reflective member having an edge, the reflecting member being disposed in the field of view of the camera to reflect light from a second one of the sites to be photographed to the cameras while light from the first one of the sites travels past the edge of the reflective member and enters the camera without reflection.

2. A photographing apparatus according to claim 1, wherein the edge of the reflective member is located substantially at an optical axis running at the center of the photographing field angle.

3. A photographing apparatus according to claim 1, further comprising photographing field angle alteration means for altering respective photographing field angles, formed by dividing the photographing field angle with the photographing field angle dividing means.

4. A photographing apparatus according to claim 1, further comprising memory means for storing the image data generated by the image data generation means.

5. A photographing apparatus according to claim 1, wherein the reflective member is a first reflective member, and the photographing field angle dividing means further comprises a second reflective member disposed to reflect light from a third one of the sites to be photographed, the first and second reflective member being disposed symmetrically with respect to the field of view of the camera.

6. A photographing apparatus according to claim 5, wherein a frame is formed on a boundary between the first and second reflective members.

7. A photographing apparatus according to claim 1, wherein the photographing field angle dividing means further comprises a motor, and means, linking the motor to the reflective member, for altering the position of the reflective member when the motor rotates.

8. A monitoring system for use with a transaction processing unit having a slot for passage of at least one object to or from a hand of a user of the transaction processing unit during a transaction, comprising:
   recording means for storing image data; and
   a photographing apparatus for photographing the user of the transaction processing unit, wherein the photographing apparatus records in the recording means image data of the user photographed so as to correspond with operation of the transaction processing unit in the course of the transaction,
   wherein the photographing apparatus photographs multiple targets that include the face of the user and sites of the user, other than the face, and combines image data of the face of the user and the sites of the user, other than the face, into one before recording in the recording means the image data so as to correspond with operation of the transaction processing unit in the course of the transaction,
   wherein the photographing apparatus includes at least one reflective member and a camera having a field of view, the camera being aimed directly at one of the targets to receive light from it without reflection, and the at least one reflective member being disposed in the field of view of the camera to reflect light from at least one other target to the camera, and
   wherein the sites of the user, other than the face, include the hand of the user as the hand is positioned adjacent the slot during passage of the at least one object, the slot itself also being included in the photograph.

9. A monitoring system according to claim 8, further comprising read-out means for reading out specific image data from among image data recorded in the recording means on the basis of predetermined classification.

10. The monitoring system according to claim 8, wherein the transaction processing unit has a sensor that is activated by the hand of the user during the course of the transaction, and wherein activation of the sensor triggers the recording of image data in the recording means.

11. The monitoring system according to claim 8, wherein the slot is adapted for receiving and returning a card employed by the user during the transaction, and further comprising a sensor disposed adjacent the slot to detect the card, and wherein activation of the sensor triggers the recording of image data in the recording means.

12. The monitoring system according to claim 8, wherein the slot is adapted for receiving and returning a bankbook of the user during the transaction, and further comprising a sensor disposed adjacent the slot to detect the bankbook, and wherein activation of the sensor triggers the recording of image data in the recording means.

13. The monitoring system according to claim 8, wherein the slot is adapted for dispensing banknotes, and further comprising a sensor disposed adjacent the slot to detect the hand of the user as the user picks up the banknotes, and wherein activation of the sensor triggers the recording of image data in the recording means.

14. The monitoring system according to claim 8, wherein the slot is adapted for dispensing coins, and further a sensor disposed adjacent the slot to detect the hand of the user as the user picks up the coins, and wherein activation of the sensor triggers the recording of image data in the recording means.

15. The monitoring system according to claim 8, wherein the slot is a first slot that is adapted for receiving and returning a card employed by the user of the transaction processing unit during the transaction, wherein the transaction processing unit also has a second slot that is adapted for dispensing banknotes, and further comprising a first sensor disposed adjacent the first slot to detect the card and a second sensor disposed adjacent the second slot to detect the hand of the user as the user picks up the banknotes, and wherein activation of either of the first and second sensors triggers the recording of image data in the recording means.

16. The monitoring system according to claim 8, further comprising a video monitor having a screen, and means for dividing the screen into first and second regions and for displaying the combined image data on the screen, such that the face of the user is displayed in the first region of the screen and the sites of the user, other than the face, are displayed in the second region of the screen.

17. The monitoring system according to claim 8, further comprising a video monitor having a screen, and means for dividing the screen into first, second, and third regions and for displaying the combined image data on the screen, such that the face of the user is displayed in the first region of the screen and two sites of the user, other than the face, are displayed in the second and third regions of the screen.

18. The monitoring system according to claim 8, wherein the at least one reflective member includes a first flat mirror and a second flat mirror that is disposed at an obtuse angle with respect to the first flat mirror.

19. A monitoring system for use with an automatic teller machine having a screen for conveying information to a person using the automatic teller machine and having a slot for passage of at least one object to or from a hand of the person, comprising:
   a camera aimed at the slot to capture an image of the hand of the person adjacent the slot; and
   a mirror in front of the camera but not obscuring the slot from the camera, the mirror being oriented to reflect an image of the face of the person to the camera.

* * * * *